US 12,177,845 B2

(12) United States Patent
Fan et al.

(10) Patent No.: US 12,177,845 B2
(45) Date of Patent: Dec. 24, 2024

(54) SLOT POSITION OFFSETS ASSOCIATED WITH A DOWNLINK CONTROL INFORMATION IN A PHYSICAL DOWNLINK SHARED CHANNEL

(71) Applicant: QUALCOMM Incorporated, San Diego, CA (US)

(72) Inventors: Zhifei Fan, San Diego, CA (US); Jing Sun, San Diego, CA (US); Xiaoxia Zhang, San Diego, CA (US); Tao Luo, San Diego, CA (US); Srinivas Yerramalli, San Diego, CA (US); Arumugam Chendamarai Kannan, San Diego, CA (US); Wooseok Nam, San Diego, CA (US); Sungwoo Park, San Diego, CA (US); Ahmed Abdelaziz Ibrahim Abdelaziz Zewail, San Diego, CA (US); Akula Reddy, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/335,871

(22) Filed: Jun. 15, 2023

(65) Prior Publication Data
US 2023/0328734 A1 Oct. 12, 2023

Related U.S. Application Data

(62) Division of application No. 17/159,427, filed on Jan. 27, 2021, now Pat. No. 11,737,094.
(Continued)

(51) Int. Cl.
*H04W 72/20* (2023.01)
*H04L 5/00* (2006.01)
(Continued)

(52) U.S. Cl.
CPC ........... *H04W 72/20* (2023.01); *H04L 5/0048* (2013.01); *H04W 72/0446* (2013.01); *H04W 72/0453* (2013.01)

(58) Field of Classification Search
CPC ............. H04W 72/20; H04W 72/0446; H04W 72/0453; H04W 72/046; H04L 5/0048
See application file for complete search history.

(56) References Cited

U.S. PATENT DOCUMENTS 10,616,869 B2 4/2020 Chen et al.
10,856,280 B2 * 12/2020 Noh ....................... H04L 1/1822
(Continued)

FOREIGN PATENT DOCUMENTS

CN 110324904 A 10/2019
CN 110366250 A 10/2019
(Continued)

OTHER PUBLICATIONS

International Preliminary Report On Patentability—PCT/US2021/015418—The International Bureau of WIPO—Geneva, Switzerland—Aug. 11, 2022.
(Continued)

*Primary Examiner* — Raj Jain
(74) *Attorney, Agent, or Firm* — QUALCOMM Incorporated

(57) ABSTRACT

In an aspect, a PDCCH and a PDSCH are transmitted by a BS to a UE, whereby the PDCCH includes a first DCI part and the PDSCH includes a second DCI part (e.g., a 2-part DCI). In an example a first grant associated with the second DCI part is offset relative to a slot position of the second DCI part, whereas a second grant associated with the second DCI part is offset relative to the slot position to which the first
(Continued)

grant is offset. In another aspect, two or more grants are grouped together, with the respective group being mapped to a PUCCH.

22 Claims, 19 Drawing Sheets

Related U.S. Application Data

(60) Provisional application No. 62/968,824, filed on Jan. 31, 2020.

(51) Int. Cl.
*H04W 72/0446* (2023.01)
*H04W 72/0453* (2023.01)

(56) References Cited

U.S. PATENT DOCUMENTS

| | | | |
|---|---|---|---|
| 2018/0124753 A1 | 5/2018 | Sun et al. | |
| 2019/0253976 A1* | 8/2019 | Pelletier | H04W 52/146 |
| 2019/0281545 A1 | 9/2019 | Kim et al. | |
| 2019/0394759 A1 | 12/2019 | Ying et al. | |
| 2020/0008238 A1* | 1/2020 | Huang | H04W 74/0808 |
| 2020/0015202 A1 | 1/2020 | Khoshnevisan et al. | |
| 2020/0037260 A1 | 1/2020 | Fu et al. | |
| 2020/0100219 A1* | 3/2020 | Takeda | H04W 72/23 |
| 2021/0243745 A1 | 8/2021 | Fan et al. | |
| 2022/0232478 A1* | 7/2022 | Huang | H04L 5/0053 |
| 2023/0328734 A1* | 10/2023 | Fan | H04W 72/20 370/336 |

FOREIGN PATENT DOCUMENTS

| | | |
|---|---|---|
| EP | 3209082 A1 | 8/2017 |
| WO | WO-2017139097 | 8/2017 |
| WO | 2018144873 A1 | 8/2018 |

OTHER PUBLICATIONS

International Search Report and Written Opinion—PCT/US2021/015418—ISA/EPO—Jul. 20, 2021.
Partial International Search Report—PCT/US2021/015418—ISA/EPO—May 25, 2021.

\* cited by examiner

SLOT POSITION OFFSETS ASSOCIATED WITH A DOWNLINK CONTROL INFORMATION IN A PHYSICAL DOWNLINK SHARED CHANNEL

CROSS-REFERENCE TO RELATED APPLICATION

The present application for Patent is a Divisional of U.S. Provisional application Ser. No. 17/159,427, entitled "SLOT POSITION OFFSETS ASSOCIATED WITH A DOWNLINK CONTROL INFORMATION IN A PHYSICAL DOWNLINK SHARED CHANNEL", filed Jan. 27, 2021, which in turn claims the benefit of U.S. Provisional Application No. 62/968,824, entitled "SLOT POSITION OFFSETS ASSOCIATED WITH A DCI IN A PDSCH", filed Jan. 31, 2020, each of which is assigned to the assignee hereof and each of which is hereby expressly incorporated by reference herein in its entirety.

BACKGROUND OF THE DISCLOSURE

1. Field of the Disclosure

Aspects of the disclosure relate generally to wireless communications and to techniques and apparatuses related to slot position offsets associated with a Downlink Control Information (DCI) in a Physical Downlink Shared Channel (PDSCH).

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some systems, to reduce control overhead and improve the processing timeline, a downlink control information (DCI) may be split into two portions (or parts). A first DCI portion may be transmitted within a PDCCH, while a second DCI portion may be transmitted within a Physical Downlink Shared Channel (PDSCH), a procedure commonly referred to as a DCI piggyback. The PDCCH and associated PDSCH carrying the respective DCI portions may be transmitted in the same slot or in different slots. The first DCI portion may include initial control information regarding an assignment (or grant), such as the resource assignment, rank and modulation order of the assignment (e.g., UL grant or DL grant). In addition, the first DCI portion may also include control information about the second DCI portion in a control information field.

In an aspect of the disclosure, a method, a computer-readable medium, and an apparatus are provided. The apparatus may be a base station. The base station may schedule, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI. The base station may determine, for a first of a plurality of grants, a first slot position that is offset by a first slot level offset relative to a slot position of the second part of the DCI in the PDSCH, may determine, for a second of the plurality of grants, a second slot position that is offset by a second slot level offset relative to the first slot position, and may transmit the PDCCH and the PDSCH during the at least one slot.

In another aspect of the disclosure, a method, a computer-readable medium, and an apparatus are provided. The apparatus may be a UE. The UE may receive, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI. The UE may determine, for a first of a plurality of grants, a first slot position that is offset by a first slot level offset relative to a slot position of the second part of the DCI in the PDSCH, and may determine, for a second of the plurality of grants, a second slot position that is offset by a second slot level offset relative to the first slot position.

In an aspect of the disclosure, a method, a computer-readable medium, and an apparatus are provided. The apparatus may be a base station. The base station may schedule, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI. The base station may transmit the PDCCH and the PDSCH during the at least one slot, may group two or more grants included in the second part of the DCI in a first group, and may map each grant in the first group to a first Physical Uplink Control Channel (PUCCH).

In another aspect of the disclosure, a method, a computer-readable medium, and an apparatus are provided. The apparatus may be a UE. The UE may receive, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI. The UE may group two or more grants included in the second part of the DCI in a first group, and may map each grant in the first group to a first Physical Uplink Control Channel (PUCCH).

Aspects generally include a method, apparatus, system, computer program product, non-transitory computer-readable medium, user equipment, cIoT user equipment, base station, wireless communication device, and/or processing system as substantially described with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
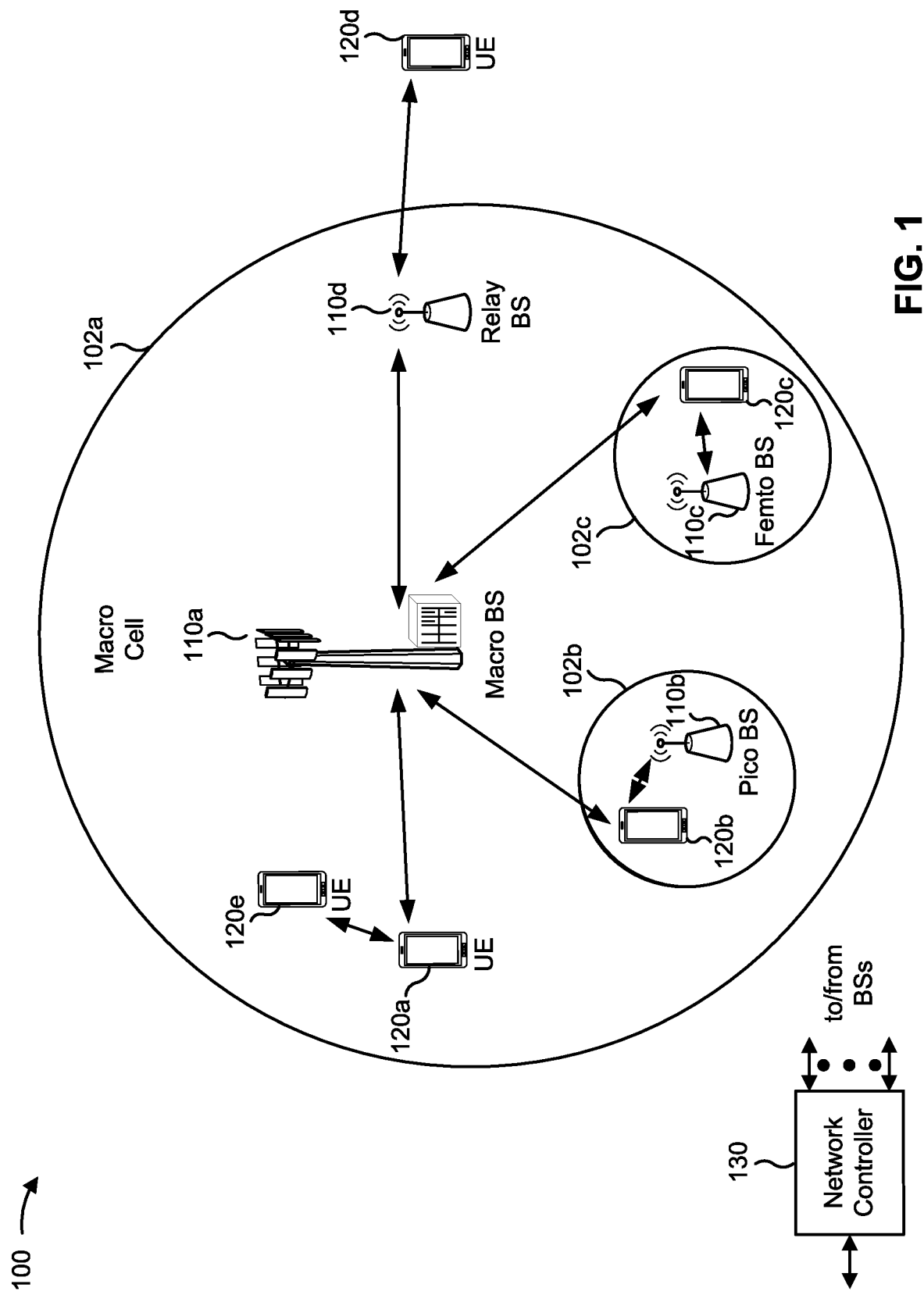
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station)

allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
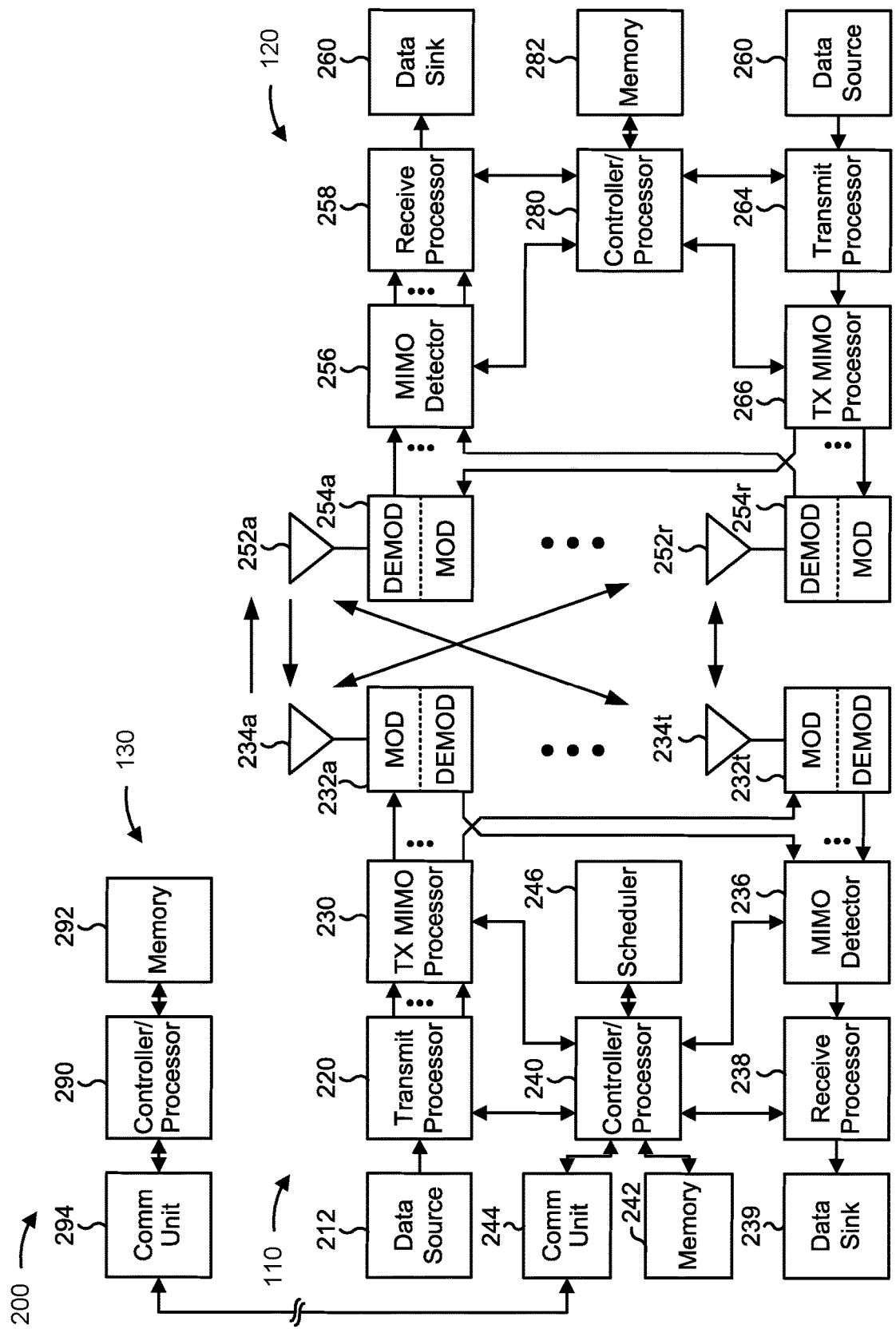
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency divisional multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of various processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

As noted above, various device types may be characterized as UEs. Starting in 3GPP Rel. 17, a number of these UE types are being allocated a new UE classification denoted as Reduced Capability (RedCap') or 'NR-Light'. Examples of UE types that fall under the RedCap classification include wearable devices (e.g., smart watches, etc.), industrial sensors, video cameras (e.g., surveillance cameras, etc.), and so on. Generally, the UE types grouped under the RedCap classification are associated with lower communicative capacity. For example, relative to 'normal' UEs (e.g., UEs not classified as RedCap), RedCap UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some RedCap UEs may also be sensitive in terms of power consumption (e.g., requiring a long battery life, such as several years) and may be highly mobile. Moreover, in some designs, it is generally desirable for RedCap UEs to co-exist with UEs implementing protocols such as eMBB, URLLC, LTE NB-IoT/MTC, and so on.

A Physical Downlink Control Channel (PDCCH) may be used to carry a Downlink Control Information (DCI). The DCI within the PDCCH provides downlink resource assignments and/or uplink resource grants for one or more UEs. Multiple PDCCHs may be transmitted each slot and each PDCCH may carry user-specific DCI or common DCI (e.g., control information broadcast to a group of UEs). Each DCI may further include a cyclic redundancy check (CRC) bit that is scrambled with a radio network temporary identifier (RNTI), which may be a specific user RNTI or a group RNTI, to allow the UE to determine the type of control information sent in the PDCCH.

In some systems, to reduce control overhead and improve the processing timeline, the DCI may be split into two portions. A first DCI portion may be transmitted within a PDCCH, while a second DCI portion, referred to as a 'piggybacked' DCI may be transmitted within a Physical Downlink Shared Channel (PDSCH). The PDCCH and associated PDSCH carrying the respective DCI portions may be transmitted in the same slot or in different slots.

The first DCI portion may include initial control information regarding an assignment (or grant), such as the resource assignment, rank and modulation order of the assignment (e.g., UL grant or DL grant). In addition, the first DCI portion may also include control information about the second DCI portion in a control information field. In some examples, the control information may indicate the number of resource elements (size) and code rate of the second DCI portion. The second DCI portion may include remaining control information regarding the grant (and/or other grant (s)). For example, the remaining control information may include non-time critical control information, such as the HARQ process ID, redundancy version ID, a new data indicator, transmit power control indicator, channel quality indicator request, sounding reference signal request, or downlink assignment index. Thus, the UE may utilize the first DCI portion to identify user data traffic within the PDSCH to be decoded and may buffer the user data traffic while the second DCI portion is decoded.

As noted above, the second DCI portion may include multiple grants (e.g., one or more UL grants, one or more DL grants, or a combination thereof). The second DCI portion may be either single-user or multi-user (e.g., using a group RNTI for the first DCI portion in conjunction with an addressing scheme in the second DCI portion for respective UEs to extract their respective parts). In some designs, the first DCI portion can be scheduled in accordance with a semi-persistent scheduling (SPS) protocol, whereas the second DCI portion can be dynamically scheduled via higher-layer signaling (e.g., RRC signaling).

In some NR systems, PDCCH is delivered in the Control Resource Set (coreset). A UE may perform blind decoding (BD) of multiple BD candidates in the coreset to identify a particular DCI targeting that UE. In an example, the PDDCH may be sent with a wider beam than the PDSCH, or alternatively via the same beam as the PDSCH. The BD candidates may be organized in search space sets, and one or more search space sets may be associated with one coreset. The NR PDCCH BD design is carried over from the LTE PDCCH BD design, and is generally optimized for the scenario where multiple UEs are served with PDCCH at the same time (e.g., optimized so as to reduce blocking between UEs to randomly hash locations of PDDCH from different UEs differently in the coreset). In a millimeter wave (mmW) use case, due to the analog beam transmission restriction and very short slots in time domain (due to SCS scaling up) in some NR systems, the chance of sending multiple DCIs to different UEs is greatly reduced (compared to FR1). Instead, it is more likely in such NR systems for multiple DL/UL grants to be transmitted to the same UE (e.g., multiple DL/UL grants to handle relatively long DL/UL bursty traffic).

The above-noted piggybacked DCI design may be particularly useful for mmW implementations. For example, the piggybacked DCI design can help to reduce PDDCH BD so the UE PDCCH processing is made faster. In another example, the piggybacked DCI (or second DCI portion) may share the same beam as the PDSCH (e.g., same QCL) and thus can be more efficiently delivered (e.g., the beam used for PDSCH can be narrower than the PDSCH beam).

In NR systems, the PDDCH may be associated with various slot-level offsets that are used to map the PDDCH to another slot. One example is a PDCCH-to-PDSCH slot-level offset (e.g., jointly encoded together with Start and Length Indicator (SLIV) for the time domain allocation for PDSCH), which is denoted as K0. One example is a PDCCH-to-PUSCH slot-level offset (e.g., jointly encoded together with SLIV for the time domain allocation for PDSCH), which is denoted as K2. The PDSCH may also be associated with various slot-level offsets that are used to map the PDSCH to another slot. One example is a PDSCH-to-PUCCH slot-level offset, which is denoted as K1.

Figure 3:
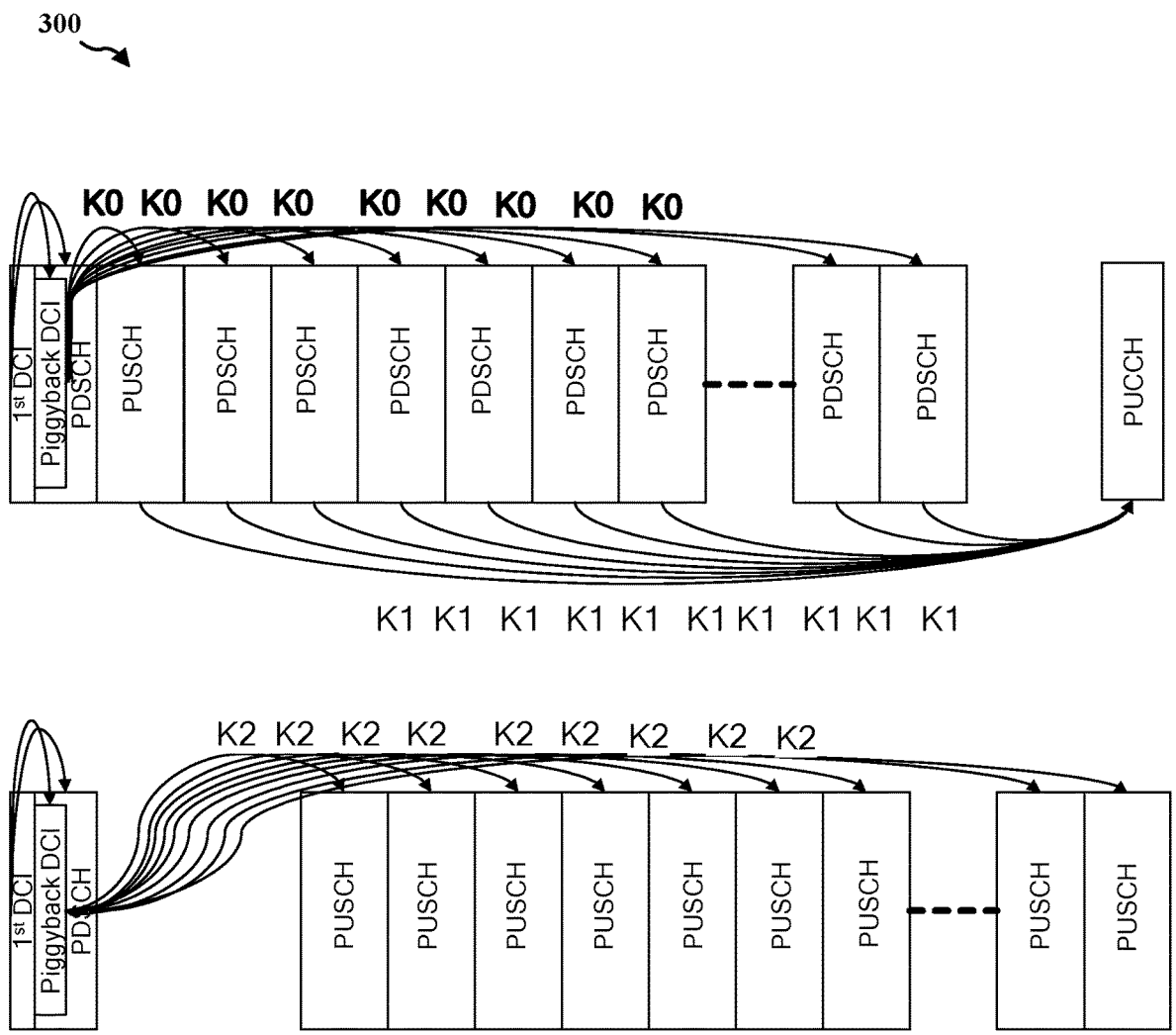
FIG. 3 illustrates scenarios where a piggybacked DCI includes numerous K0-K2 values, which functions to increase the size (or footprint) of the piggybacked DCI within its respective PDSCH according to an aspect of the disclosure.

In NR systems, the K0-K2 values are encoded in a DCI associated with the PDDCH (e.g., such as a piggybacked DCI in the PDSCH). Each K0-K2 is associated with a value that is indexed to a time-offset in a pre-defined Time Domain Resource Allocation (TDRA) table. These time-offsets are each relative to the PDDCH. In scenarios where there are a high number of grants in the piggybacked DCI part of the PDSCH (e.g., to grant a long DL or UL burst to a particular UE or group of UEs using one piggybacked DCI), this necessitates a high number of K0/K1/K2 offsets in the piggybacked DCI, leaving less room for data traffic in the PDSCH (e.g., especially when the number of HARQ processes increases to handle a very short slot length). By way of example, FIG. 3 illustrates scenarios 300 where a piggybacked DCI includes numerous K0-K2 values, which functions to increase the size (or footprint) of the piggybacked DCI within its respective PDSCH. In other words, the piggybacked DCI may include a number of constituent DCIs (e.g., 2-part DCIs) that each has its own respective K0/K1/K2 offset(s) that functions to increase the size of the piggybacked DCI.

Each DCI (or grant) included with the piggybacked DCI is associated with the same piggybacked DCI codeword, and is protected by the same cell-specific reference signal (CRS). Hence, either all of the DCIs of the piggybacked DCI are decoded, or none of the DCIs of the piggybacked DCI are decoded. There will thereby be no partial detection error event. These characteristics are different from normal DCI design, where each DCI may be associated with its own codeword and/or CRS.

Figure 4:
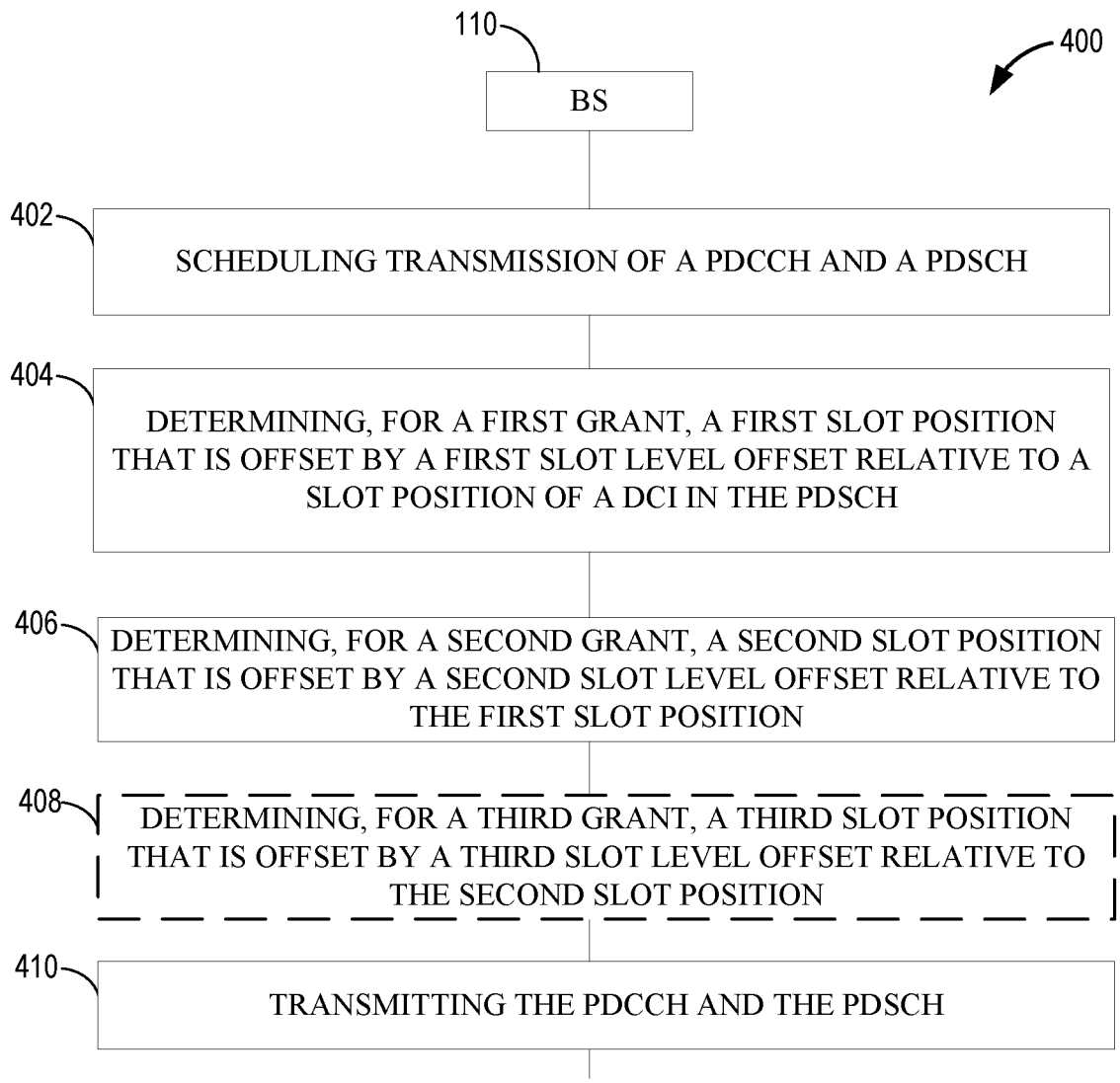
FIG. 4 illustrates an exemplary process of wireless communications according to an aspect of the disclosure.

FIG. 4 illustrates an exemplary process 400 of wireless communications according to an aspect of the disclosure. The process 400 of FIG. 4 is performed by BS 110.

At 402, BS 110 (e.g., scheduler 246, controller/processor 240, etc.) schedules, during at least one slot, transmission of a PDCCH and a PDSCH, the PDCCH including a first part of a Downlink Control Information (DCI), the PDSCH including a second part of the DCI. In an example, the first and second parts of the DCI may comprise a two-part DCI as described above. In some designs, the first DCI part may include a control information field associated with the second part of the DCI within the PDSCH. The second part of the DCI may comprise a plurality of grants, such as UL grant(s) and/or DL grant(s), and may be associated with a single UE or multiple UEs. For example, the second part of the DCI may not merely supplement the first part of the DCI (e.g., forming a single two-part DCI), but may include other DCIs as well (e.g., one or more other Part-2 DCIs that form one or more other two-part DCIs, for the same UE or other UE(s). In an example, two or more of the grants (or DCIs) may be adjacent to each other within a piggybacked DCI.

At 404, BS 110 (e.g., controller/processor 240, etc.) determines, for a first of a plurality of grants, a first slot position that is offset by a first slot level offset relative to a slot position of the second part of the DCI in the PDSCH. In an example, the first slot level offset may be a PDCCH-to-PDSCH slot level offset (e.g., K0). In another example, the first slot level offset may be a PDCCH-to-PUSCH slot level offset (e.g., K2).

At 406, BS 110 (e.g., controller/processor 240, etc.) determines, for a second of the plurality of grants, a second slot position that is offset by a second slot level offset relative to the first slot position. In an example where the first slot level offset is a PDCCH-to-PDSCH slot level offset (e.g., K0), the second slot level offset may be between two adjacent PDSCHs. In an example where the first slot level offset is a PDCCH-to-PUSCH slot level offset (e.g., K2), the second slot level offset may be between two adjacent PUSCHs.

At 408, BS 110 (e.g., controller/processor 240, etc.) optionally determines, for a third of the plurality of grants, a third slot position that is offset by a third slot level offset relative to the second slot position. In an example where the first slot level offset is a PDCCH-to-PDSCH slot level offset (e.g., K0), the third slot level offset may be between two adjacent PDSCHs. In an example where the first slot level offset is a PDCCH-to-PUSCH slot level offset (e.g., K2), the third slot level offset may be between two adjacent PUSCHs.

At 410, BS 110 (e.g., antenna(s) 234a . . . 234t, modulators(s) 232a . . . 232a, TX MIMO processor 230, TX processor 220) transmits the PDCCH and the PDSCH during the at least one slot. In an example, the at least one slot may comprise a single slot or multiple slots.

Figure 5:
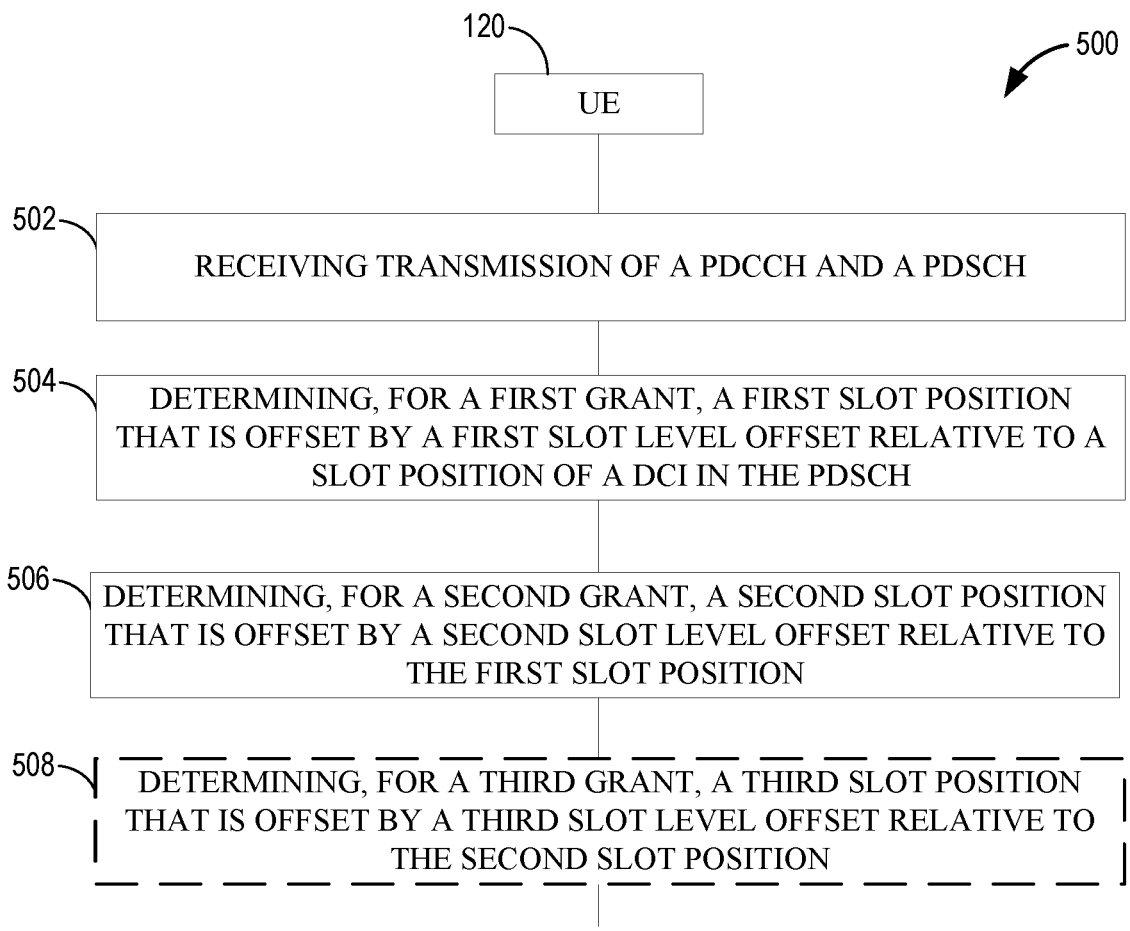
FIG. 5 illustrates another exemplary process of wireless communications according to another aspect of the disclosure.

FIG. 5 illustrates an exemplary process 500 of wireless communications according to an aspect of the disclosure. The process 500 of FIG. 5 is performed by UE 120.

At 502, UE 120 (e.g., antenna(s) 252a . . . 252r, MIMO detector 256, receive processor 258, etc.) receives, during at least one slot, transmission from a base station of a PDCCH and a PDSCH, the PDCCH including a first part of a Downlink Control Information (DCI), the PDSCH including a second part of the DCI. In an example, the first and second parts of the DCI may comprise a two-part DCI as described above. In some designs, the first DCI part may include a control information field associated with the second part of the DCI within the PDSCH. The second part of the DCI may comprise a plurality of grants, such as UL grant(s) and/or DL grant(s), and may be associated with a single UE or multiple UEs. For example, the second part of the DCI may not merely supplement the first part of the DCI (e.g., forming a single two-part DCI), but may include other DCIs as well (e.g., one or more other Part-2 DCIs that form one or more other two-part DCIs, for the same UE or other UE(s). In an example, two or more of the grants (or DCIs) may be adjacent to each other within a piggybacked DCI.

At 504, UE 120 (e.g., controller/processor 280, etc.) determines, for a first of a plurality of grants, a first slot position that is offset by a first slot level offset relative to a slot position of the second part of the DCI in the PDSCH. In an example, the first slot level offset may be a PDCCH-to-PDSCH slot level offset (e.g., K0). In another example, the first slot level offset may be a PDCCH-to-PUSCH slot level offset (e.g., K2).

At 506, UE 120 (e.g., controller/processor 280, etc.) determines, for a second of the plurality of grants, a second slot position that is offset by a second slot level offset relative to the first slot position. In an example where the first slot level offset is a PDCCH-to-PDSCH slot level offset (e.g., K0), the second slot level offset may be between two adjacent PDSCHs. In an example where the first slot level offset is a PDCCH-to-PUSCH slot level offset (e.g., K2), the second slot level offset may be between two adjacent PUSCHs.

At 508, UE 120 (e.g., controller/processor 280, etc.) optionally determines, for a third of the plurality of grants, a third slot position that is offset by a third slot level offset relative to the second slot position. In an example where the first slot level offset is a PDCCH-to-PDSCH slot level offset (e.g., K0), the third slot level offset may be between two adjacent PDSCHs. In an example where the first slot level offset is a PDCCH-to-PUSCH slot level offset (e.g., K2), the third slot level offset may be between two adjacent PUSCHs.

Referring to FIGS. 4-5, in a first example, the first and second slot positions may be specified via reference to a pre-defined TDRA table. As shown below with respect to FIGS. 6-7, a gap may be defined between the first and second grants.

Figure 6:
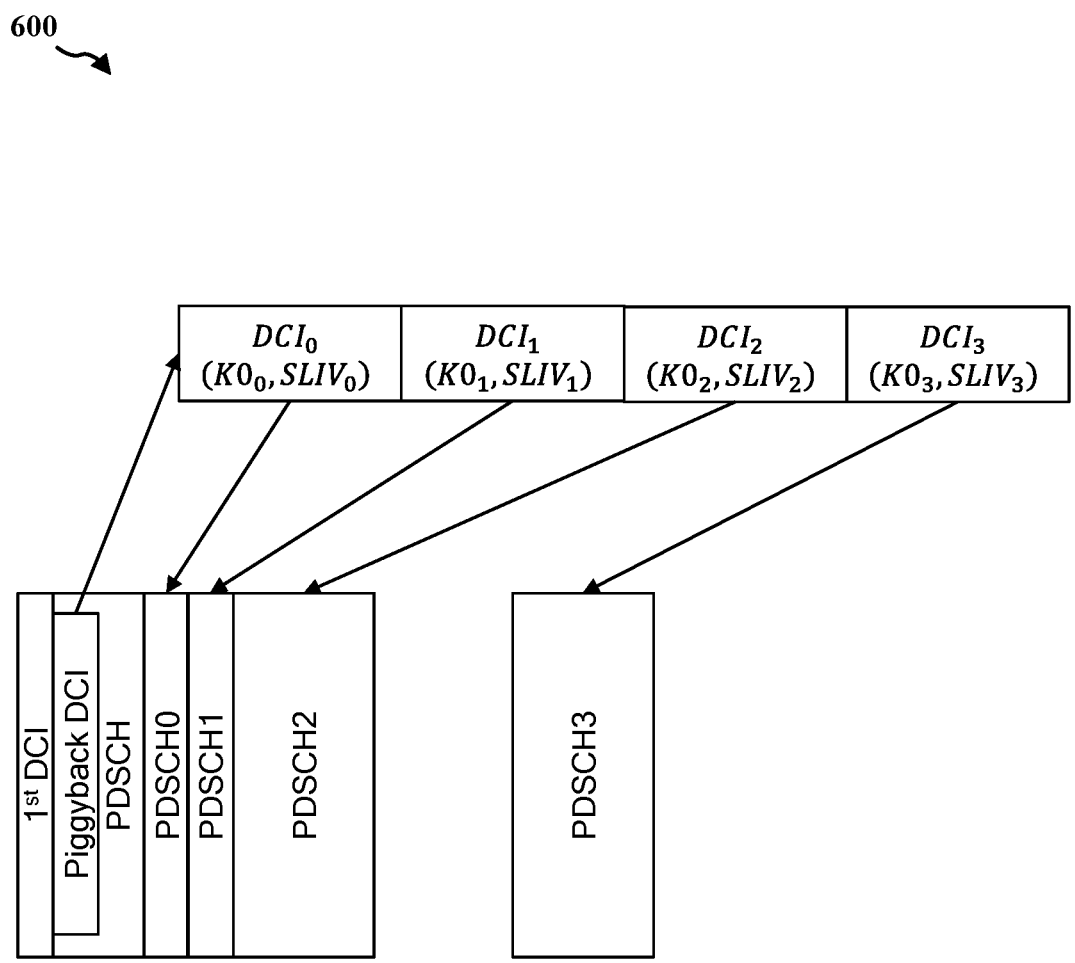
FIG. 6 illustrates a downlink-specific slot offset implementation according to an aspect of the disclosure.

FIG. 6 illustrates a downlink-specific slot offset implementation 600 with respect to in accordance with this first example. In FIG. 6, $DCI_0$ has (K0,SLIV) for the first PDSCH in slot $X_0$. $DCI_{i+1}$ has (K2, SLIV) where K0 is with respect to the slot $X_i$, where $X_{i+1}=X_i+K_0$. If K0=0, this PDSCH will be in the same slot as in the previous PDSCH. If K0=1, this PDSCH will be in the next slot from the previous PDSCH. Hence, multiple mini-slot level PDSCH is supported in a slot. For example, $DCI_0$ and $DCI_1$ in example with $K0_1=0$ and $SLIV_0$ and $SLIV_1$ are in the same slot (non-overlapping). It will be appreciated that back-to-back assignment of PDSCHs is possible with proper K0 and SLIV selections. However, gaps between assigned PDSCHs are also possible as shown in FIG. 6 (e.g., PDSCH2 and PDSCH3 as shown in FIG. 6 have a 1 slot gap if K03=2).

Figure 7:
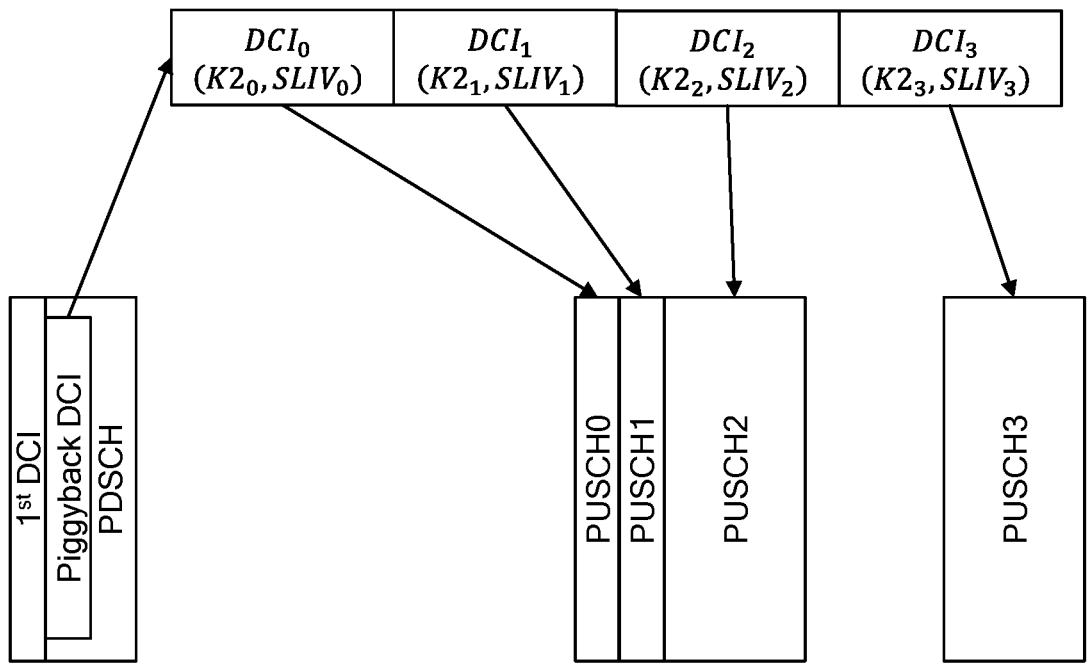
FIG. 7 illustrates a downlink-specific slot offset implementation according to another aspect of the disclosure.

FIG. 7 illustrates an uplink-specific slot offset implementation 700 with respect to in accordance with this first example. In FIG. 7, $DCI_0$ has (K2,SLIV) for the first PUSCH in slot $X_0$. $DCI_{i+1}$ has (K2, SLIV) where K2 is with respect to the slot $X_i$, where $X_{i+1}=X_i+K_0$. If K2=0, this PUSCH will be in the same slot as in the previous PUSCH. If K2=1, this PUSCH will be in the next slot from the previous PUSCH. Hence, multiple mini-slot level PUSCH is supported in a slot. For example, $DCI_0$ and $DCI_1$ in example with $K2_1=0$ and $SLIV_0$ and $SLIV_1$ are in the same slot (non-overlapping). It will be appreciated that back-to-back assignment of PUSCHs is possible with proper K2 and SLIV selections. However, gaps between assigned PUSCHs are also possible as shown in FIG. 7 (e.g., PUSCH2 and PUSCH3 as shown in FIG. 7 have a 1 slot gap if K23=2).

Referring to FIGS. 4-5, in a second example, the first slot position may be specified via reference to a pre-defined TDRA table, whereas the second slot position is not specified via reference to the pre-defined TDRA table. Rather, the second slot position is specified (e.g., implicitly) based on the first and second slot positions being adjacent without any intervening gap. For example, K0/K2 for follow-up DCIs in the piggybacked DCI may be omitted (or if included, the UE can ignore). For example, with respect to FIGS. 4-5, the first and second grants may be associated with SLIVs, respectively. If the second SLIV is determined to be able to fit into the same slot as the first SLIV, the second slot position is (by implication) in the same slot. If the second SLIV is determined not to be able to fit into the same slot as the first SLIV, then the second slot position is (by implication) in a next slot. To put another way, If $SL/V_{i+1}$ can fit into the remaining part of slot of $SLIV_i$, assume $SL/V_{i+1}$ is in the same slot; otherwise, assume $SL/V_{i+1}$ is in the next slot.

Figure 8:
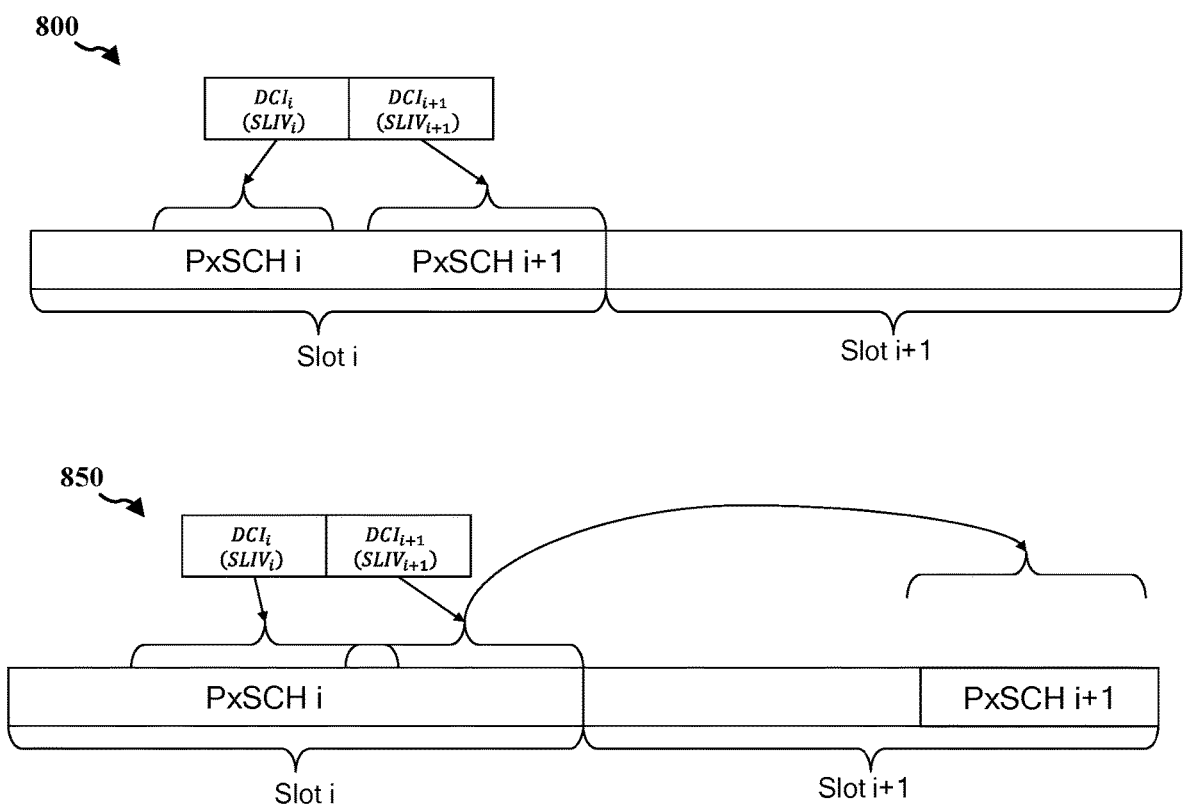
FIG. 8 illustrates slot offset implementations according to other aspects of the disclosure.

FIG. 8 illustrates slot offset implementations 800-805 with respect to in accordance with this second example. In FIG. 8, PxSCH can be either PUSCH or PDSCH depending on the specific implementation. The slot offset implementation of 800 demonstrates an example whereby $SLIV_{i+1}$ of $PxSCH_{i+1}$ can fit into the same slot, as PxSCH By contrast, the slot offset implementation of 805 demonstrates an example whereby $SLIV_{i+1}$ of $PxSCH_{i+1}$ cannot fit into the same slot, as PxSCH and is instead moved to the next $slot_{i+1}$.

Figure 9:
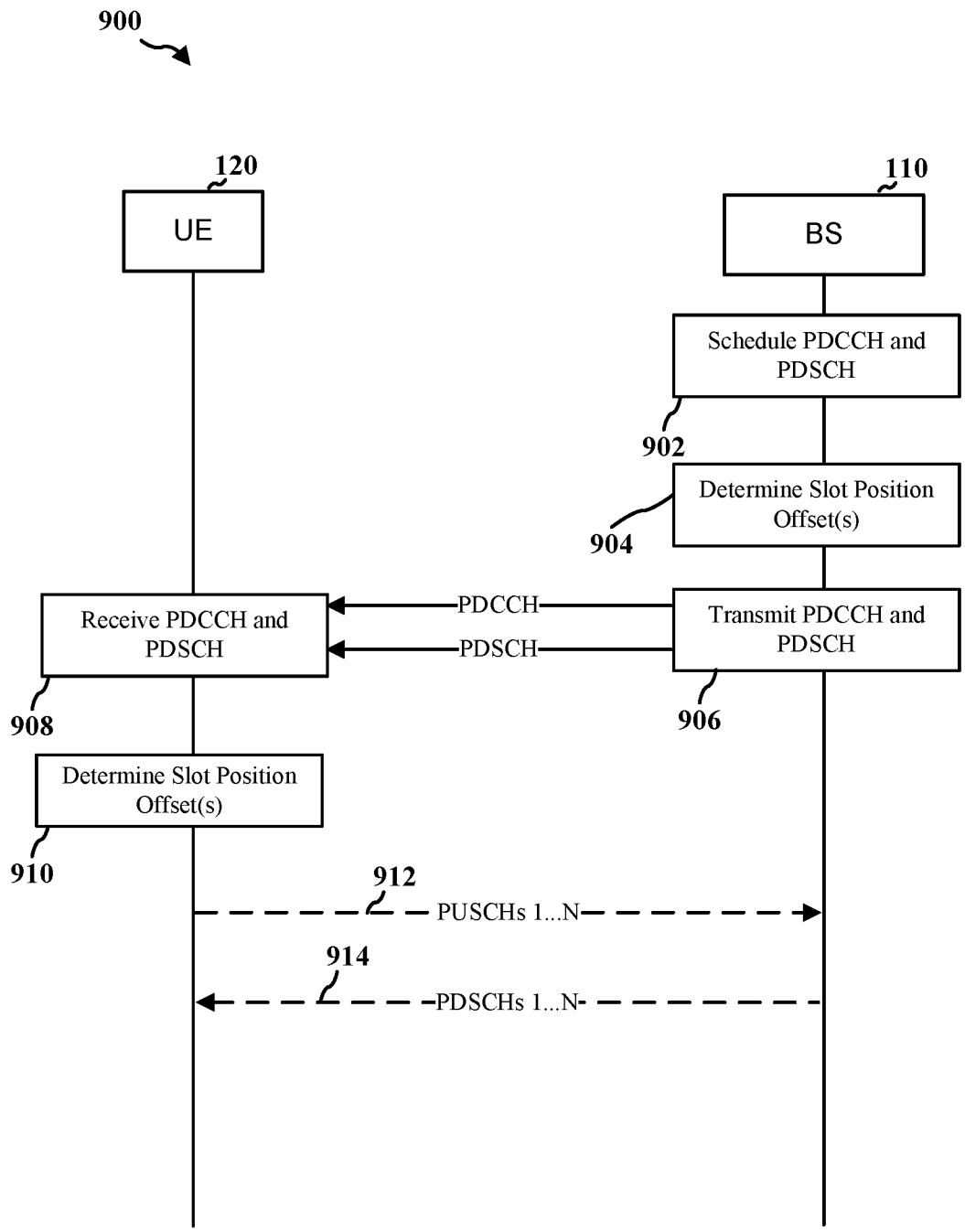
FIG. 9 illustrates an example implementation of the processes of FIGS. 4-5 in accordance with an embodiment of the disclosure.

FIG. 9 illustrates an example implementation 900 of the processes 400-500 of FIGS. 4-5 in accordance with an embodiment of the disclosure.

At 902, BS 110 schedules transmission of the PDCCH and PDSCH. In an example, 902 may correspond to 402 of FIG. 4 (e.g., the scheduled PDCCH may comprise the first part of the DCI with the PDSCH comprising a piggybacked DCI that includes the second DCI part, etc.). The piggybacked DCI may include multiple grants, such as UL grant(s), DL grant(s) or a combination thereof, which in turn may be associated with a single UE or multiple UEs.

At 904, BS 110 determines slot position offset(s). For example, 904 may correspond to 404-406 and/or optional 408. For example, the slot position offsets may comprise a PDCCH-to-PDSCH slot level offset (e.g., K0) and/or a PDCCH-to-PUSCH slot level offset (e.g., K2). The slot position offset(s) may be relative to the PDCCH, to a neighboring PUSCH of PDSCH, or some combination thereof, as described above with respect to FIGS. 4-8.

At 906, BS 110 transmits the PDCCH and PDSCH to UE 120 (e.g., and possibly other UEs associated with the grant(s) in one or more DCIs of the PDSCH), and the UE 120 receives the PDCCH and PDSCH at 908. In an example, 904-906 of FIG. 9 may correspond to 410 of FIG. 4 and 502 of FIG. 5, respectively. In an example, the transmission of the PDCCH and the PDSCH at 904-906 may occur within a single slot or across multiple slots.

At 910, UE 120 determines the slot position offset(s). For example, the slot position offsets may comprise a PDCCH-to-PDSCH slot level offset (e.g., K0) and/or a PDCCH-to-PUSCH slot level offset (e.g., K2). The slot position offset(s) may be relative to the PDCCH, to a neighboring PUSCH of PDSCH, or some combination thereof, as described above with respect to FIGS. 4-8.

At 912, UE 120 optionally transmits PUSCH(s) 1 . . . N in accordance with the slot position offset(s). For example, the location of the PUSCH(s) may be relative to the PDCCH, to a neighboring PUSCH, or some combination thereof, as described above with respect to FIGS. 4-8.

At 914, BS 110 optionally transmits PDSCH(s) 1 . . . N in accordance with the slot position offset(s). For example, the location of the PDSCH(s) may be relative to the PDCCH, to a neighboring PDSCH, or some combination thereof, as described above with respect to FIGS. 4-8.

Figure 10:
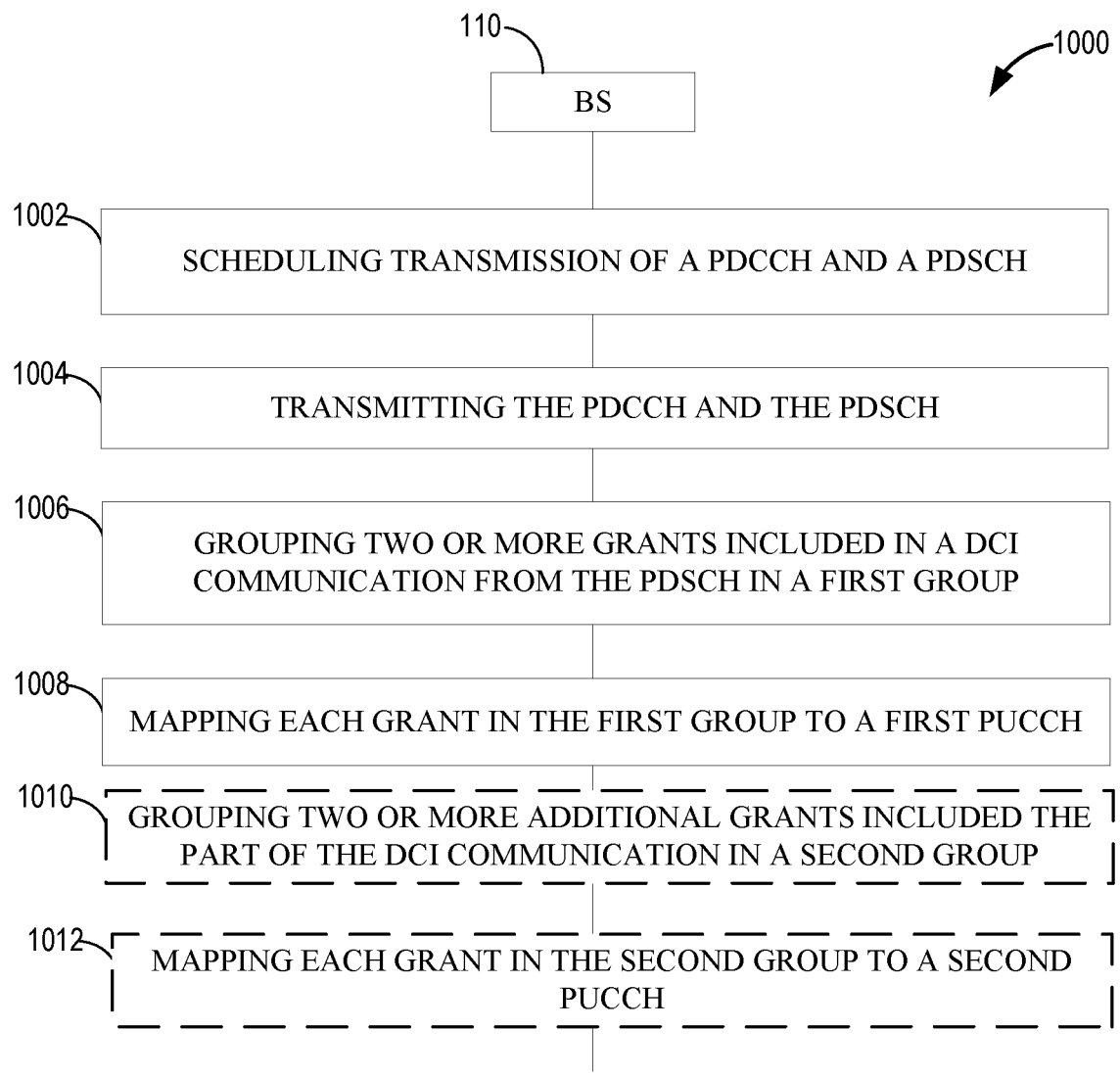
FIG. 10 illustrates an exemplary process of wireless communications according to another aspect of the disclosure.

FIG. 10 illustrates an exemplary process 1000 of wireless communications according to an aspect of the disclosure. The process 1000 of FIG. 10 is performed by BS 110.

At 1002, BS 110 (e.g., scheduler 246, controller/processor 240, etc.) schedules, during at least one slot, transmission of a PDCCH and a PDSCH, the PDCCH including a first part of a Downlink Control Information (DCI), the PDSCH including a second part of the DCI. In an example, the first and second parts of the DCI may comprise a two-part DCI as described above. In some designs, the first DCI part may include a control information field associated with the second part of the DCI within the PDSCH. The second part of the DCI may comprise a plurality of grants, such as UL grant(s) and/or DL grant(s), and may be associated with a single UE or multiple UEs. For example, the second part of the DCI may not merely supplement the first part of the DCI (e.g., forming a single two-part DCI), but may include other DCIs as well (e.g., one or more other Part-2 DCIs that form one or more other two-part DCIs, for the same UE or other UE(s). In an example, two or more of the grants (or DCIs) may be adjacent to each other within the piggybacked DCI.

At 1004, BS 110 (e.g., antenna(s) 234a . . . 234t, modulators(s) 232a . . . 232a, TX MIMO processor 230, TX processor 220) transmits the PDCCH and the PDSCH during the at least one slot. In an example, the at least one slot may comprise a single slot or multiple slots.

At 1006, BS 110 (e.g., controller/processor 240, etc.) groups two or more grants included in the second part of the DCI in a first group. In some designs, the grouping at 1006 can be based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset. In other designs, the grouping at 1006 is based on an association between (i) a latest of the two or more grants being associated with a first non-zero DCI-to-PUCCH offset, and (ii) at least one non-latest grant of the two or more grants being associated with a first zero or non-numerical DCI-to-PUCCH offset.

At 1008, BS 110 (e.g., controller/processor 240, etc.) maps each grant in the first group to a first PUCCH. In an example, BS 110 can subsequently monitor the first PUCCH in association with the first group.

At 1010, BS 110 (e.g., controller/processor 240, etc.) optionally groups two or more additional grants included in the second part of the DCI in a second group. In some designs, the grouping at 1010 can be based on an association between (i) an earliest of the two or more additional grants being associated with a first non-zero DCI-to-PUCCH offset, and (ii) at least one non-earliest of the two or more additional grants being associated with a first zero or non-numerical DCI-to-PUCCH offset. In other designs, the grouping at 1010 is based on an association between (i) a latest of the two or more additional grants being associated with a first non-zero DCI-to-PUCCH offset, and (ii) at least one non-latest grant of the two or more additional grants being associated with a first zero or non-numerical DCI-to-PUCCH offset.

At 1012, BS 110 (e.g., controller/processor 240, etc.) maps each grant in the second group to a second PUCCH. In an example, BS 110 can subsequently monitor the second PUCCH in association with the second group.

Figure 11:
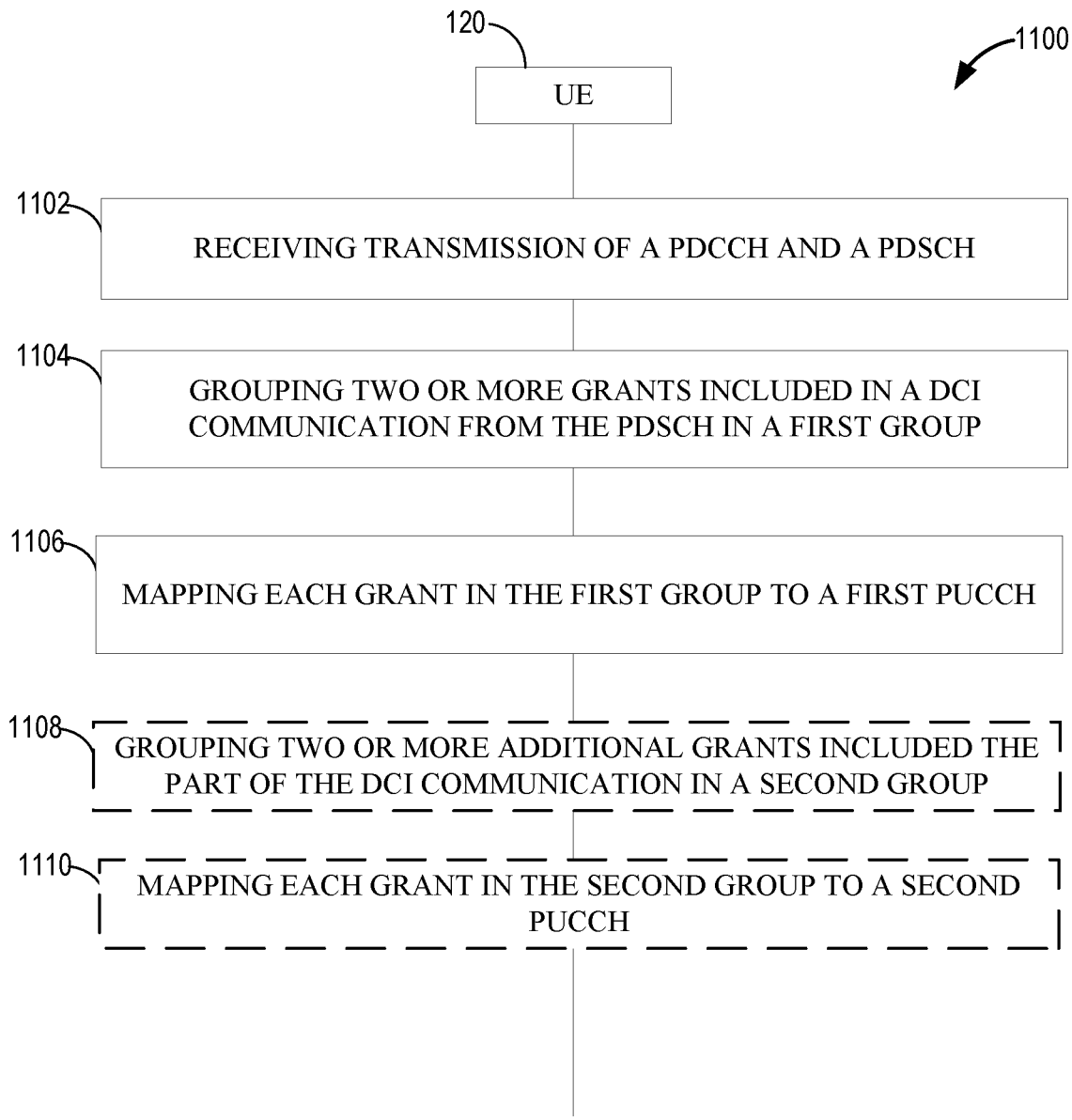
FIG. 11 illustrates another exemplary process of wireless communications according to another aspect of the disclosure.

FIG. 11 illustrates an exemplary process 1100 of wireless communications according to an aspect of the disclosure. The process 1100 of FIG. 11 is performed by UE 120.

At 1102, UE 120 (e.g., antenna(s) 252a ... 252r, MIMO detector 256, receive processor 258, etc.) receives, during at least one slot, transmission from a base station of a PDCCH and a PDSCH, the PDCCH including a first part of a Downlink Control Information (DCI), the PDSCH including a second part of the DCI. In an example, the first and second parts of the DCI may comprise a two-part DCI as described above. In some designs, the first DCI part may include a control information field associated with the second part of the DCI within the PDSCH. The second part of the DCI may comprise a plurality of grants, such as UL grant(s) and/or DL grant(s), and may be associated with a single UE or multiple UEs. For example, the second part of the DCI may not merely supplement the first part of the DCI (e.g., forming a single two-part DCI), but may include other DCIs as well (e.g., one or more other Part-2 DCIs that form one or more other two-part DCIs, for the same UE or other UE(s).e. In an example, two or more of the grants (or DCIs) may be adjacent to each other within the piggybacked DCI.

At 1104, UE 120 (e.g., controller/processor 280, etc.) groups two or more grants included in the second part of the DCI in a first group. In some designs, the grouping at 1104 can be based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset. In other designs, the grouping at 1104 is based on an association between (i) a latest of the two or more grants being associated with a first non-zero DCI-to-PUCCH offset, and (ii) at least one non-latest grant of the two or more grants being associated with a first zero or non-numerical DCI-to-PUCCH offset.

At 1106, UE 120 (e.g., controller/processor 280, etc.) optionally maps each grant in the first group to a first PUCCH. In an example, UE 110 can subsequently transmit the first PUCCH in association with the first group.

At 1108, UE 120 (e.g., controller/processor 280, etc.) optionally groups two or more additional grants included in the second part of the DCI in a second group. In some designs, the grouping at 1108 can be based on an association between (i) an earliest of the two or more additional grants being associated with a first non-zero DCI-to-PUCCH offset, and (ii) at least one non-earliest of the two or more additional grants being associated with a first zero or non-numerical DCI-to-PUCCH offset. In other designs, the grouping at 1108 is based on an association between (i) a latest of the two or more additional grants being associated with a first non-zero DCI-to-PUCCH offset, and (ii) at least one non-latest grant of the two or more additional grants being associated with a first zero or non-numerical DCI-to-PUCCH offset.

At 1110, UE 120 (e.g., controller/processor 280, etc.) optionally maps each grant in the second group to a second PUCCH. In an example, UE 120 can subsequently transmit the second PUCCH in association with the second group.

Various PDSCH group configurations that may be used as part of the processes 1000-1100 of FIGS. 10-11 are described below with respect to FIGS. 12-15.

Figure 12:
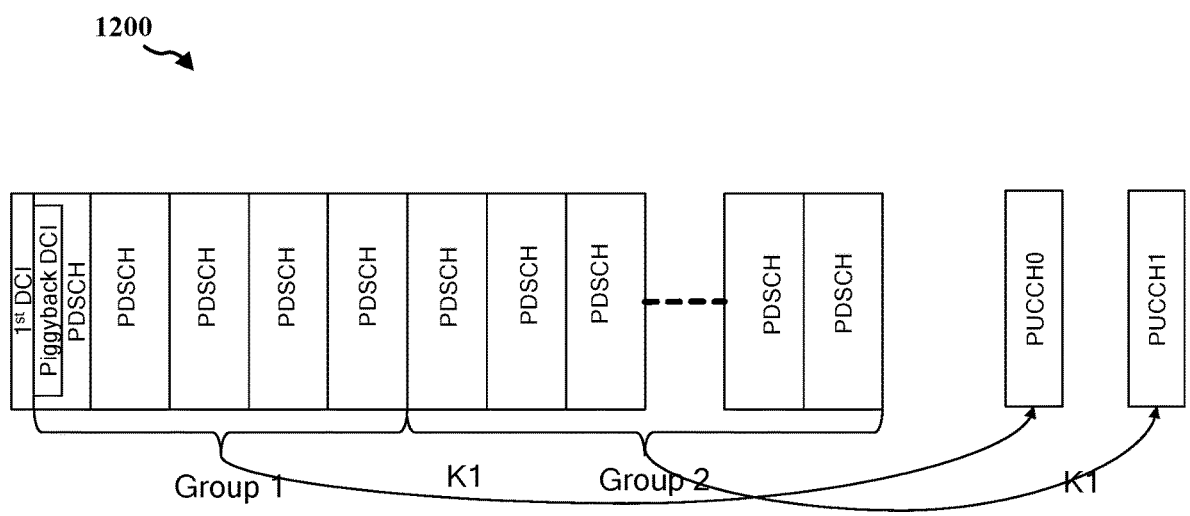
FIGS. 12-15 illustrate PDSCH group configurations in accordance with aspects of the disclosure.

FIG. 12 illustrates an example PDSCH group configuration 1200 in accordance with an embodiment of the disclosure. In contrast to the K0/K2 design described above, there are multiple reference locations (multiple PDSCHs as opposed to a single piggybacked DCI) in K1 design. However, by grouping the PDSCHs together, the grouped PDSCHs function as a single reference location to the associated PUCCH, such that a single K1 value can be associated with each respective PDSCH group. As shown in FIG. 12, each PDSCH group comprises consecutive DL grants in a piggybacked DCI, and a first PDSCH group includes the PDSCH granted by the first DCI in the piggybacked DCI.

Figure 13:
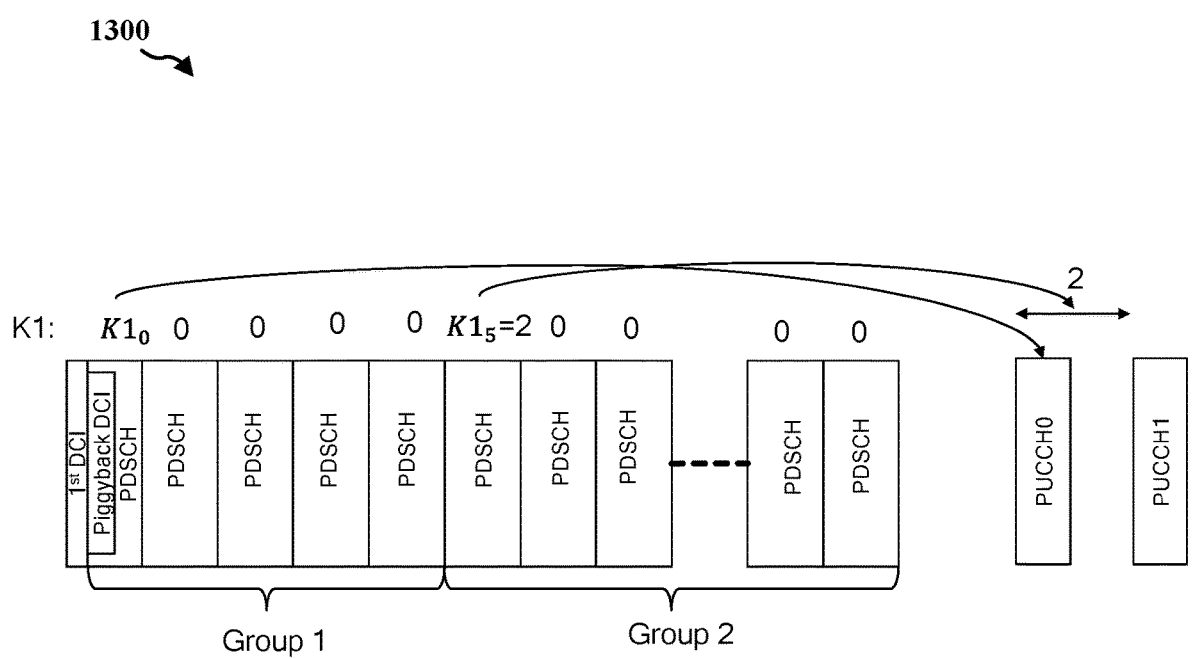

FIG. 13 illustrates an example PDSCH group configuration 1300 in accordance with another embodiment of the disclosure. In FIG. 13, a non-zero K1 value marks the startpoint of a new PDSCH group. Each subsequent zero K1 value is placed into that group. Hence, $K1_0$ is non-zero, and the four subsequent K1 values are zero, thereby forming Group 1. Next, $K1_5$ is non-zero, and subsequent K1 values are zero, thereby forming Group 2, and so on. Moreover, after Group 1, Group 2's PUCCH1 may be offset relative to PUCCH0 instead of PUCCH1. As used herein, the term DCI-to-PUCCH offset is used to refer to any K1 value, irrespective of whether this is made in reference to a direct DCI-to-PUCCH offset (e.g., $K1_0$ in FIG. 13) an indirect PUCCH-to-PUCCH offset (e.g., $K1_5$ in FIG. 13, or any of the zero-valued K1s) that is relative to a DCI-to-PUCCH offset. For example, for the sequence of DL grants with K1 values: $K1_0$, $K1_1$, ..., $K1_{N-1}$, if $K1_{i+1}=0$, the PUCCH of DCI i+1 will be in the same slot (same PUCCH) as DCI i. As a modification to FIG. 13, non-numerical (NN) K1 values may be used in place of zero K1 values for group association.

Figure 14:
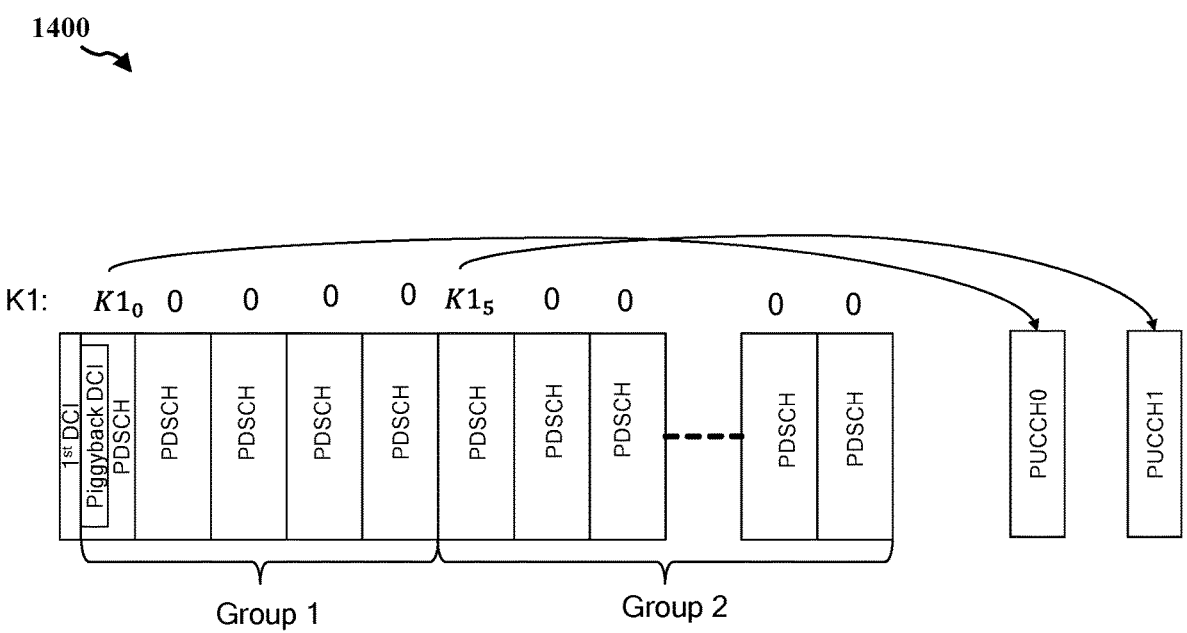

FIG. 14 illustrates an example PDSCH group configuration 1400 in accordance with another embodiment of the disclosure. In FIG. 14, similar to FIG. 13, a non-zero K1 value marks the startpoint of a new PDSCH group. Each subsequent zero K1 value is placed into that group. Hence, $K1_0$ is non-zero, and the four subsequent K1 values are zero, thereby forming Group 1. Next, $K1_5$ is non-zero, and subsequent K1 values are zero, thereby forming Group 2, and so on. In contrast to FIG. 13, non-zero K1 in DCI in legacy way (reference is the PDSCH location), but zero K1 is interpreted as relative to the previous non-zero K1 PUCCH location, instead of the location of the corresponding PDSCH. So, different K1 values are interpreted with respect to different reference locations in the same PDSCH group. For the sequence of DL grants with K1 values: K10, $K1_1$, ..., $K1_{N-1}$, if $K1_{i+1}=0$, the PUCCH of DCI i+1 will be in the same slot (same PUCCH) as DCI i. As a modification to FIG. 14, non-numerical (NN) K1 values may be used in place of zero K1 values for group association.

Figure 15:
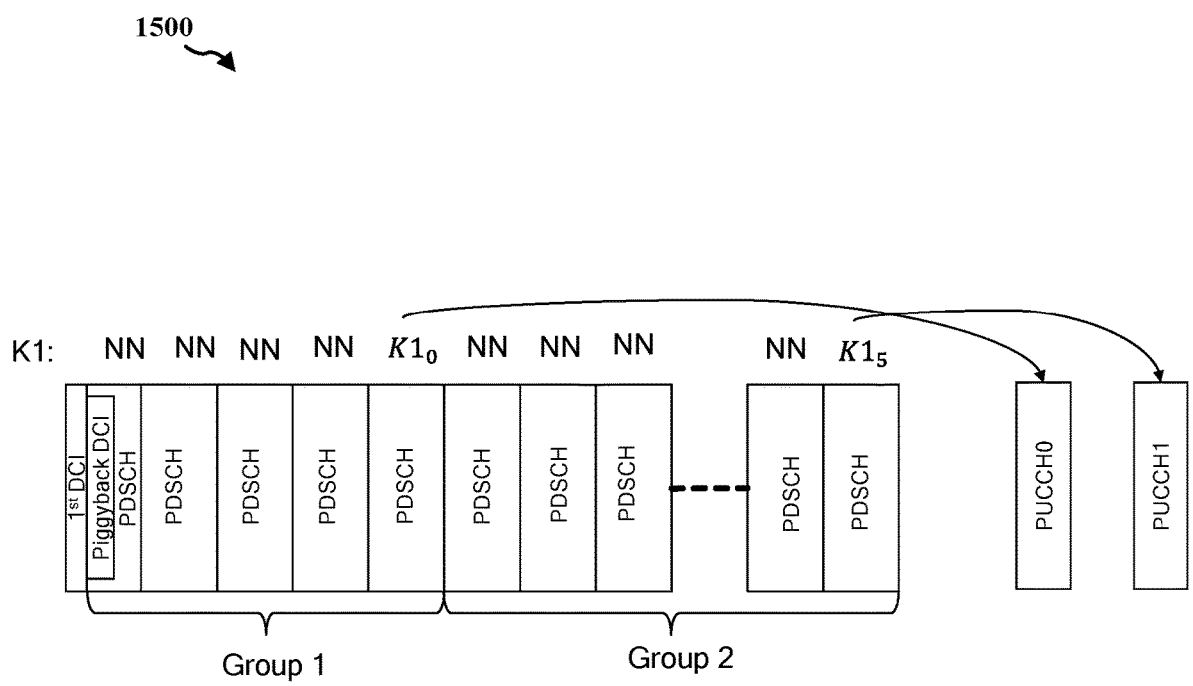

FIG. 15 illustrates an example PDSCH group configuration 1500 in accordance with another embodiment of the disclosure. In FIG. 15, NN values for K1 are used for group association. For example, with a NN K1 is signaled in a DL grant, and no explicit timing for PUCCH is in the DL grant, the UE will use the PUCCH timing when receiving a later DL grant with a numeric, non-zero K1 indication. In this example, for each PDSCH group, earlier DL grants with NN K1 s are made part of the PDSCH group with a latest DL grant having a numeric and non-zero K1. So, in this case, the non-zero K1 is associated with the latest PDSCH in the PDSCH group instead of the earliest PDSCH in the PDSCH group as in FIGS. 13-14.

Figure 16:
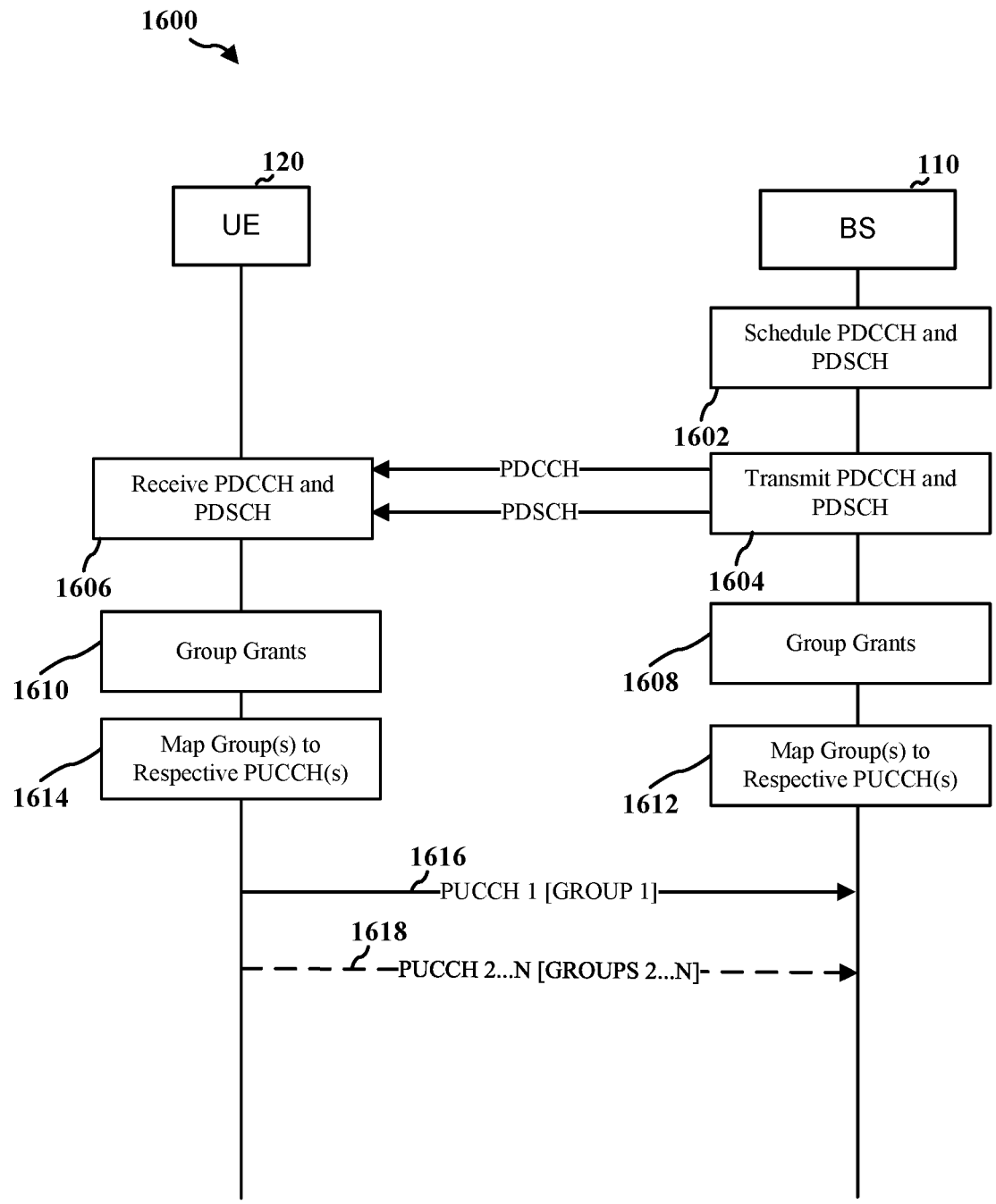
FIG. 16 illustrates an example implementation of the processes of FIGS. 10-11 in accordance with an embodiment of the disclosure.

FIG. 16 illustrates an example implementation 1600 of the processes 1000-1100 of FIGS. 10-11 in accordance with an embodiment of the disclosure.

At 1602, BS 110 schedules transmission of the PDCCH and PDSCH. In an example, 902 may correspond to 1002 of FIG. 10 (e.g., the scheduled PDCCH may comprise the first DCI part with the PDSCH comprising a piggybacked DCI that includes the second DCI part, etc.). The piggybacked DCI part may include multiple grants, such as UL grant(s), DL grant(s) or a combination thereof, which in turn may be associated with a single UE or multiple UEs.

At 1604, BS 110 transmits the PDCCH and PDSCH to UE 120 (e.g., and possibly other UEs associated with the grant(s) in one or more DCIs of the PDSCH), and the UE 120 receives the PDCCH and PDSCH at 1606. In an example, 1604-1606 of FIG. 16 may correspond to 1004 of FIG. 10 and 1102 of FIG. 11, respectively. In an example, the transmission of the PDCCH and the PDSCH at 1604-1606 may occur within a single slot or across multiple slots.

At 1608, BS 110 groups grants into respective PDSCH group(s). As described above with respect to 1006 (and 1010), the grouping can be based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset. In other designs, the grouping may be based on an association between (i) a latest of the two or more grants being associated with a first non-zero DCI-to-PUCCH offset, and (ii) at least one non-latest grant of the two or more grants being associated with a first zero or non-numerical DCI-to-PUCCH offset.

At 1610, UE 120 groups grants into respective PDSCH group(s). As described above with respect to 1104 (and 1108), the grouping can be based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset. In other designs, the grouping may be based on an association between (i) a latest of the two or more grants being associated with a first non-zero DCI-to-PUCCH offset, and (ii) at least one non-latest grant of the two or more grants being associated with a first zero or non-numerical DCI-to-PUCCH offset.

At 1612, BS 110 maps the PDSCH group(s) to respective PUCCH(s). For example, the mapping can be implemented such that each PDSCH group is associated with a single offset (or K1 value) to the location of a respective PUCCH.

At 1614, UE 120 maps the PDSCH group(s) to respective PUCCH(s). For example, the mapping can be implemented such that each PDSCH group is associated with a single offset (or K1 value) to the location of a respective PUCCH.

At 1616, UE 120 transmits PUCCH 1 for PDSCH group 1 per the PUCCH mapping. For example, PUCCH 1 may correspond to any of PUCCH0 or PUCCH1 from FIG. 12, PUCCH0 or PUCCH1 from FIG. 13, or PUCCH0 or PUCCH1 from FIG. 14.

At 1618, UE 120 optionally transmits PUCCHs 2 . . . N for PDSCH group(s) 2 . . . N per the PUCCH mapping. For example, each of PUCCHs 2 . . . N may correspond to any of PUCCH0 or PUCCH1 from FIG. 12, PUCCH0 or PUCCH1 from FIG. 13, or PUCCH0 or PUCCH1 from FIG. 14.

Figure 17:
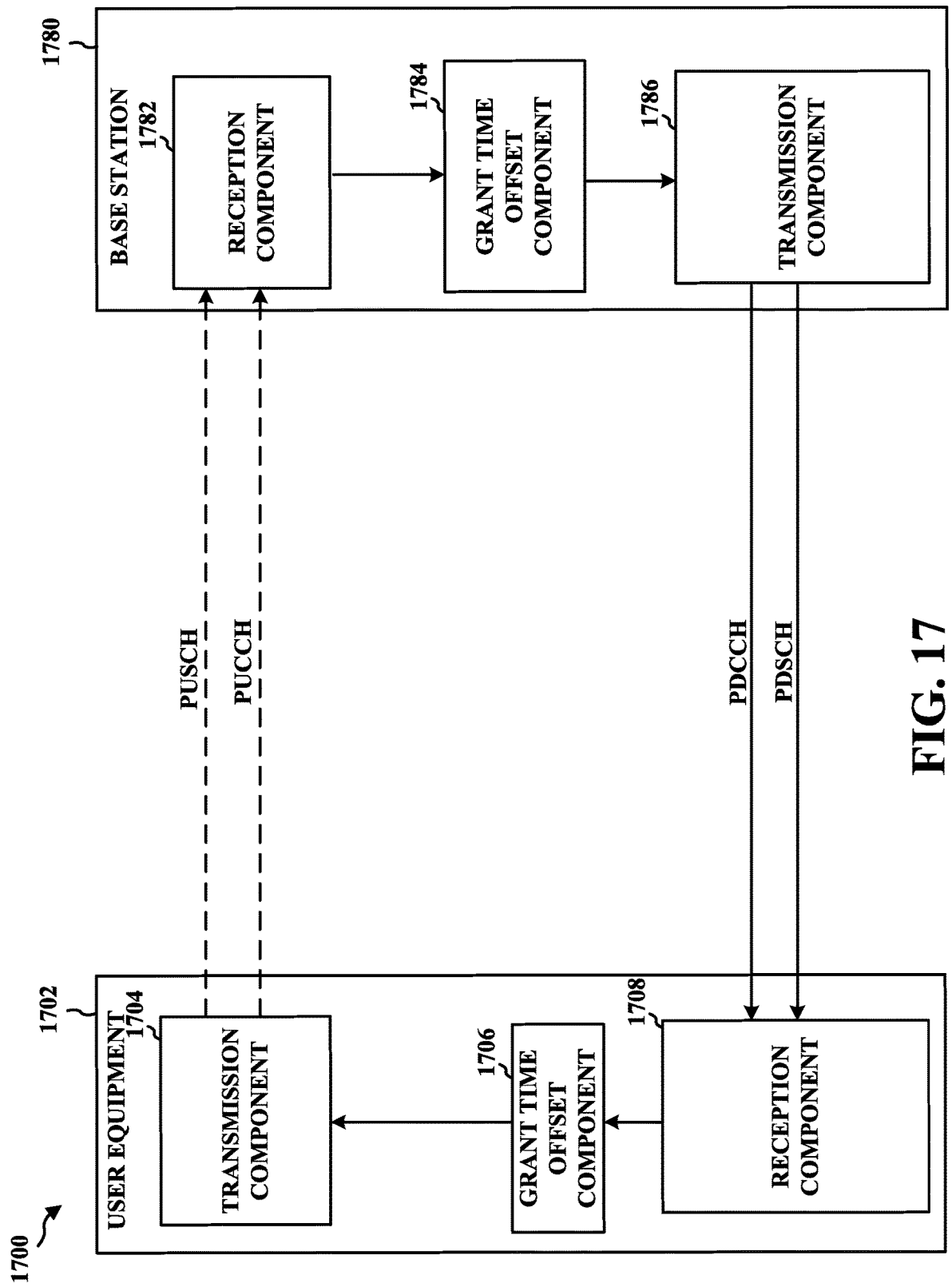
FIG. 17 is a conceptual data flow diagram illustrating the data flow between different means/components in exemplary apparatuses in accordance with an embodiment of the disclosure.

FIG. 17 is a conceptual data flow diagram 1700 illustrating the data flow between different means/components in exemplary apparatuses 1702 and 1780 in accordance with an embodiment of the disclosure. The apparatus 1702 may be a UE (e.g., UE 120) in communication with an apparatus 1780, which may be a base station (e.g., base station 110).

The apparatus 1702 includes a transmission component 1704, which may correspond to transmitter circuitry in UE 120 as depicted in FIG. 2, including controller/processor 280, antenna(s) 252a . . . 252r, modulators(s) 254a . . . 254r, TX MIMO processor 266, TX processor 264. The apparatus 1702 further includes grant time offset component 1706, which may correspond to processor circuitry in UE 120 as depicted in FIG. 2, including controller/processor 280, etc. The apparatus 1702 further includes a reception component 1708, which may correspond to receiver circuitry in UE 120 as depicted in FIG. 2, including controller/processor 280, antenna(s) 252a . . . 252r, demodulators(s) 254a . . . 254r, MIMO detector 256, RX processor 258.

The apparatus 1780 includes a reception component 1782, which may correspond to receiver circuitry in BS 110 as depicted in FIG. 2, including controller/processor 240, antenna(s) 234a . . . 234r, demodulators(s) 232a . . . 232r, MIMO detector 236, RX processor 238, communication unit 244. The apparatus 1780 further optionally includes a grant time offset 1784, which may correspond to processor circuitry in BS 110 as depicted in FIG. 2, including controller/processor 240. The apparatus 1780 further includes a transmission component 1786, which may correspond to transmission circuitry in BS 110 as depicted in FIG. 2, including e.g., controller/processor 240, antenna(s) 234a . . . 234r, modulators(s) 232a . . . 232r, Tx MIMO processor 230, TX processor 220, communication unit 244.

Referring to FIG. 17, the transmission component 1786 schedules and transmits, to the reception component 1708, a PDCCH and a PDSCH in accordance with aspects of the disclosure. The transmission component 1704 optionally schedules and transmits, to the reception component 1782, a PUCCH and/or a PUSCH. The scheduling or timing of the PDSCH, PDCCH, PUSCH and/or PUCCH may be determined based upon slot-level offsets determined by the grant time offset components 1706 and 1784.

One or more components of the apparatus 1702 and apparatus 1780 may perform each of the blocks of the algorithm in the aforementioned flowcharts of FIGS. 4-5, 9-11 and 17. As such, each block in the aforementioned flowcharts of FIGS. 4-5, 9-11 and 17 may be performed by a component and the apparatus 1702 and apparatus 1780 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
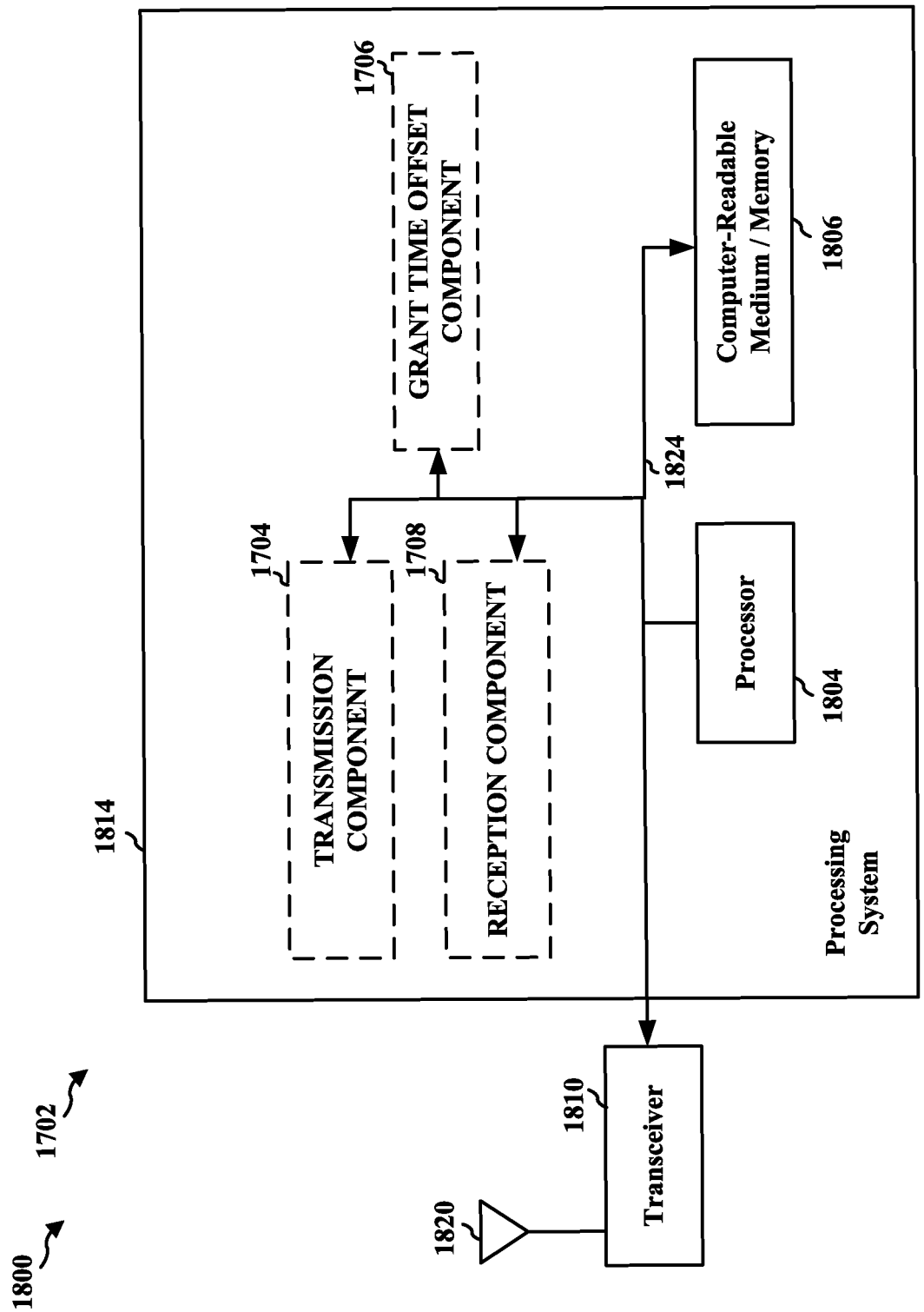
FIG. 18 is a diagram illustrating an example of a hardware implementation for an apparatus employing a processing system.

FIG. 18 is a diagram 1800 illustrating an example of a hardware implementation for an apparatus 1702 employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706 and 1708, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1708. In addition, the transceiver 1810 receives information from the processing system 1814, specifically the transmission component 1704, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706 and 1708. The components may be software components running in the processor 1804, resident/stored in the computer readable medium/memory 1806, one or more hardware components coupled to the processor 1804, or some combination thereof. The processing system 1814 may be a component of the UE 120 of FIG. 2 and may include the memory 282, and/or at least one of the TX processor 264, the RX processor 258, and the controller/processor 280.

In one configuration, the apparatus 1702 (e.g., a UE) for wireless communication includes means for receiving, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI, means for determining, for a first of a plurality of grants, a first slot position that is offset by a first slot level offset relative to a slot position of the second part of the DCI in the PDSCH, and means for determining, for a second of the plurality of grants, a second slot position that is offset by a second slot level offset relative to the first slot position.

In one configuration, the apparatus 1702 (e.g., a UE) for wireless communication includes means for receiving, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI, means for grouping two or more grants included in the second part of the DCI in a first group, and means for mapping each grant in the first group to a first Physical Uplink Control Channel (PUCCH).

The aforementioned means may be one or more of the aforementioned components of the apparatus 1702 and/or the processing system 1814 of the apparatus 1702 configured to perform the functions recited by the aforementioned means. As described supra, the processing system 1814 may include the TX processor 264, the RX processor 258, and the controller/processor 280.

Figure 19:
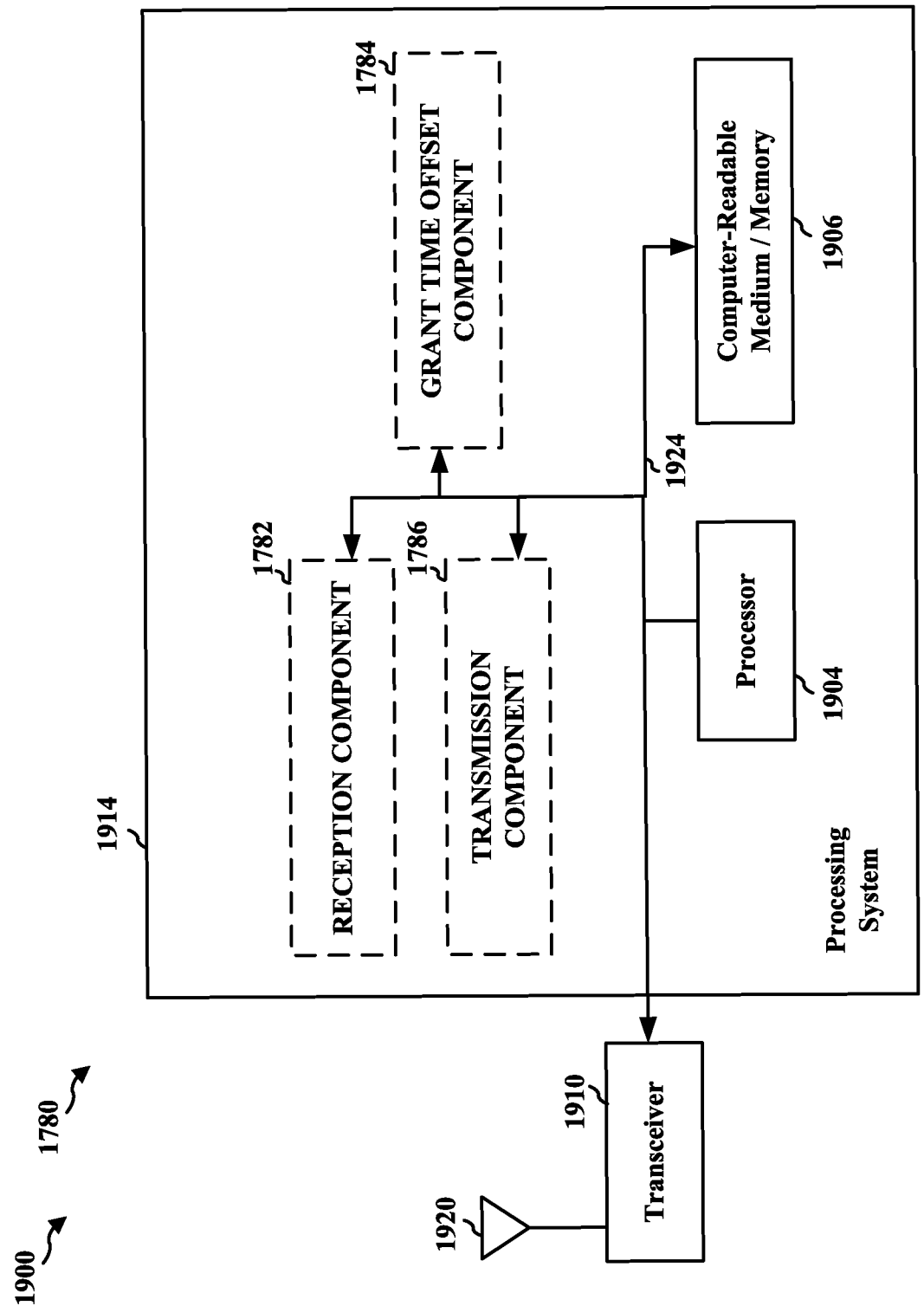
FIG. 19 is a diagram illustrating another example of a hardware implementation for an apparatus employing a processing system.

FIG. 19 is a diagram 1900 illustrating an example of a hardware implementation for an apparatus 1780 employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1782, 1784 and 1786, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1782. In addition, the transceiver 1910 receives information from the processing system 1914, specifically the transmission component 1786, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1782, 1784 and 1786. The components may be software components running in the processor 1904, resident/stored in the computer readable medium/memory 1906, one or more hardware components coupled to the processor 1904, or some combination thereof. The processing system 1914 may be a component of the BS 110 of FIG. 2 and may include the memory 242, and/or at least one of the TX processor 220, the RX processor 238, and the controller/processor 240.

In one configuration, the apparatus 1780 (e.g., a BS) for wireless communication includes means for scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI, means for determining, for a first of a plurality of grants, a first slot position that is offset by a first slot level offset relative to a slot position of the second part of the DCI in the PDSCH, means for determining, for a second of the plurality of grants, a second slot position that is offset by a second slot level offset relative to the first slot position, and means for transmitting the PDCCH and the PDSCH during the at least one slot.

In one configuration, the apparatus 1780 (e.g., a BS) for wireless communication includes means for scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI, means for transmitting the PDCCH and the PDSCH during the at least one slot, means for grouping two or more grants included in the second part of the DCI in a first group, and means for mapping each grant in the first group to a first Physical Uplink Control Channel (PUCCH).

The aforementioned means may be one or more of the aforementioned components of the apparatus 1780 and/or the processing system 1914 of the apparatus 1780 configured to perform the functions recited by the aforementioned means. As described supra, the processing system 1914 may include the TX processor 220, the RX processor 238, and the controller/processor 240.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a base station, comprising: scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI; determining, for a first of a plurality of grants, a first slot position that is offset by a first slot level offset relative to a slot position of the second part of the DCI in the PDSCH; determining, for a second of the plurality of grants, a second slot position that is offset by a second slot level offset relative to the first slot position; and transmitting the PDCCH and the PDSCH during the at least one slot.

Clause 2. The method of clause 1, wherein the first and second parts of the DCI comprise a two-part DCI.

Clause 3. The method of clause 1, wherein the first part of the DCI includes a control information field associated with the second part of the DCI within the PDSCH.

Clause 4. The method of any of clauses 1 to 3, wherein the first slot level offset is a PDCCH-to-PDSCH slot level offset, or wherein the first slot level offset is a PDCCH-to-PUSCH slot level offset, or wherein the second slot level offset is between two adjacent PDSCHs, or wherein the second slot level offset is between two adjacent PUSCHs, or a combination thereof.

Clause 5. The method of any of clauses 1 to 4, further comprising: determining, for a third of the plurality of grants, a third slot position that is offset by a third slot level offset relative to the second slot position.

Clause 6. The method of any of clauses 1 to 5, wherein the first and second grants are adjacent to each other.

Clause 7. The method of any of clauses 1 to 6, wherein the first and second slot positions are specified via reference to a pre-defined Time Domain Resource Allocation (TDRA) table.

Clause 8. The method of clause 7, wherein a gap is defined between the first and second slot positions.

Clause 9. The method of any of clauses 1 to 8, wherein the first slot position is specified via reference to a pre-defined Time Domain Resource Allocation (TDRA) table, wherein the second slot position is not specified via reference to the pre-defined TDRA table, and wherein the second slot position is indicated based on the first and second slot positions being adjacent without any intervening gap.

Clause 10. The method of clause 9, wherein the first and second grants are associated with first and second start and length indicators (SLIVs), respectively, wherein the second slot position is in the same slot if the second SLIV is determined to be able to fit into the same slot as the first SLIV, and wherein the second slot position is in a next slot if the second SLIV is determined not to be able to fit into the same slot as the first SLIV.

Clause 11. The method of any of clauses 1 to 10, wherein the plurality of grants comprises one or more downlink (DL) grants, one or more uplink (UL) grants, or a combination thereof, or wherein the plurality of grants comprises grants associated with different UEs.

Clause 12. A method of operating user equipment (UE), comprising: receiving, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI; determining, for a first of a plurality of grants, a first slot position that is offset by a first slot level offset relative to a slot position of the second part of the DCI in the PDSCH; and determining, for a second of the plurality of grants, a second slot position that is offset by a second slot level offset relative to the first slot position.

Clause 13. The method of clause 12, wherein the first part of the DCI includes a control information field associated with the second part of the DCI within the PDSCH.

Clause 14. The method of clause 13, wherein the first and second parts of the DCI comprise a two-part DCI.

Clause 15. The method of any of clauses 13 to 14, wherein the first slot level offset is a PDCCH-to-PDSCH slot level offset, or wherein the first slot level offset is a PDCCH-to-PUSCH slot level offset, or wherein the second slot level offset is between two adjacent PDSCHs, or wherein the second slot level offset is between two adjacent PUSCHs, a combination thereof.

Clause 16. The method of any of clauses 13 to 15, further comprising: determining, for a third of the of the plurality of grants, a third slot position that is offset by a third slot level offset relative to the second slot position.

Clause 17. The method of any of clauses 13 to 16, wherein the first and second grants are adjacent to each other.

Clause 18. The method of any of clauses 13 to 17, wherein the first and second slot positions are specified via reference to a pre-defined Time Domain Resource Allocation (TDRA) table.

Clause 19. The method of clause 18, wherein a gap is defined between the first and second slot positions.

Clause 20. The method of any of clauses 13 to 19, wherein the first slot position is specified via reference to a pre-defined Time Domain Resource Allocation (TDRA) table, wherein the second slot position is not specified via reference to the pre-defined TDRA table, and wherein the second slot position is indicated based on the first and second slot positions being adjacent without any intervening gap.

Clause 21. The method of clause 20, wherein the first and second grants are associated with first and second start and length indicators (SLIVs), respectively, wherein the second slot position is in the same slot if the second SLIV is determined to be able to fit into the same slot as the first SLIV, and wherein the second slot position is in a next slot if the second SLIV is determined not to be able to fit into the same slot as the first SLIV.

Clause 22. The method of any of clauses 13 to 21, wherein the plurality of grants comprises one or more downlink (DL) grants, one or more uplink (UL) grants, or a combination thereof, or wherein the plurality of grants comprises grants associated with different UEs, or a combination thereof.

Clause 23. A method of operating a base station, comprising: scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI; transmitting the PDCCH and the PDSCH during the at least one slot; grouping two or more grants included in the second part of the DCI in a first group; and mapping each grant in the first group to a first Physical Uplink Control Channel (PUCCH).

Clause 24. The method of clause 23, wherein the grouping is based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset.

Clause 25. The method of clause 24, further comprising: grouping two or more additional grants included in the second part of the DCI in a second group; and mapping each grant in the second group to a second PUCCH.

Clause 26. The method of any of clauses 23 to 25, wherein the grouping is based on an association between (i) a latest of the two or more grants being associated with a first non-zero DCI-to-PUCCH offset, and (ii) at least one non-latest grant of the two or more grants being associated with a first zero or non-numerical DCI-to-PUCCH offset.

Clause 27. A method of operating a user equipment (UE), comprising: receiving, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI; grouping two or more grants included in the second part of the DCI in a first group; and mapping each grant in the first group to a first Physical Uplink Control Channel (PUCCH).

Clause 28. The method of clause 27, wherein the grouping is based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset.

Clause 29. The method of clause 28, further comprising: grouping two or more additional grants included the second part of the DCI in a second group; and mapping each grant in the second group to a second PUCCH.

Clause 30. The method of any of clauses 27 to 29, wherein the grouping is based on an association between (i) a latest of the two or more grants being associated with a first non-zero DCI-to-PUCCH offset, and (ii) at least one grant non-latest of the two or more grants being associated with a first zero or non-numerical DCI-to-PUCCH offset.

Clause 31. An apparatus comprising a memory and at least one processor communicatively coupled to the memory, the memory and the at least one processor configured to perform a method according to any of clauses 1 to 30.

Clause 32. An apparatus comprising means for performing a method according to any of clauses 1 to 30.

Clause 33. A non-transitory computer-readable medium storing computer-executable instructions, the computer-executable comprising at least one instruction for causing a computer or processor to perform a method according to any of clauses 1 to 30.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of operating a wireless network component, comprising:
    scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI;
    transmitting the PDCCH and the PDSCH during the at least one slot;
    grouping two or more grants included in the second part of the DCI in a first group; and
    mapping each grant in the first group to a first Physical Uplink Control Channel (PUCCH);
    wherein the grouping is based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset.

2. The method of claim 1, further comprising:
    grouping two or more additional grants included in the second part of the DCI in a second group; and
    mapping each grant in the second group to a second PUCCH.

3. A method of operating a wireless network component, comprising:
    scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI;
    transmitting the PDCCH and the PDSCH during the at least one slot;
    grouping two or more grants included in the second part of the DCI in a first group; and
    mapping each grant in the first group to a first Physical Uplink Control Channel (PUCCH);
    wherein the grouping is based on an association between (i) a latest of the two or more grants being associated with a first non-zero DCI-to-PUCCH offset, and (ii) at least one non-latest grant of the two or more grants being associated with a first zero or non-numerical DCI-to-PUCCH offset.

4. A method of operating a user equipment (UE), comprising:
    receiving, during at least one slot, transmission from a wireless network component of a Physical Downlink Control Channel (PDCCH) and a Physical Downlink Shared Channel (PDSCH), the PDCCH including a first part of a Downlink Control Information (DCI), the PDSCH including a second part of the DCI;
    grouping two or more grants included in the second part of the DCI in a first group; and
    mapping each grant in the first group to a first Physical Uplink Control Channel (PUCCH);
    wherein the grouping is based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset.

5. The method of claim 4, further comprising:
    grouping two or more additional grants included the second part of the DCI in a second group; and
    mapping each grant in the second group to a second PUCCH.

6. A method of operating a user equipment (UE), comprising:
    receiving, during at least one slot, transmission from a wireless network component of a Physical Downlink Control Channel (PDCCH) and a Physical Downlink Shared Channel (PDSCH), the PDCCH including a first part of a Downlink Control Information (DCI), the PDSCH including a second part of the DCI;
    grouping two or more grants included in the second part of the DCI in a first group; and
    mapping each grant in the first group to a first Physical Uplink Control Channel (PUCCH);
    wherein the grouping is based on an association between (i) a latest of the two or more grants being associated with a first non-zero DCI-to-PUCCH offset, and (ii) at least one grant non-latest of the two or more grants being associated with a first zero or non-numerical DCI-to-PUCCH offset.

7. A wireless network component, comprising:
    one or more memories; and
    one or more processors communicatively coupled to the one or more memories, the one or more processors, either alone or in combination, configured to:
    scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI;
    transmit the PDCCH and the PDSCH during the at least one slot;
    group two or more grants included in the second part of the DCI in a first group; and
    map each grant in the first group to a first Physical Uplink Control Channel (PUCCH);
    wherein the grouping is based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset.

8. The wireless network component of claim 7, wherein the one or more processors are further configured to:

group two or more additional grants included in the second part of the DCI in a second group; and map each grant in the second group to a second PUCCH.

9. A wireless network component, comprising:

one or more memories; and one or more processors communicatively coupled to the one or more memories, the one or more processors, either alone or in combination, configured to:

scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI;

transmit the PDCCH and the PDSCH during the at least one slot;

group two or more grants included in the second part of the DCI in a first group; and map each grant in the first group to a first Physical Uplink Control Channel (PUCCH);

wherein the grouping is based on an association between (i) a latest of the two or more grants being associated with a first non-zero DCI-to-PUCCH offset, and (ii) at least one non-latest grant of the two or more grants being associated with a first zero or non-numerical DCI-to-PUCCH offset.

10. A user equipment (UE), comprising:

one or more memories; and one or more processors communicatively coupled to the one or more memories, the one or more processors, either alone or in combination, configured to:

receive, during at least one slot, transmission from a wireless network component of a Physical Downlink Control Channel (PDCCH) and a Physical Downlink Shared Channel (PDSCH), the PDCCH including a first part of a Downlink Control Information (DCI), the PDSCH including a second part of the DCI;

group two or more grants included in the second part of the DCI in a first group; and map each grant in the first group to a first Physical Uplink Control Channel (PUCCH);

wherein the grouping is based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset.

11. The UE of claim 10, wherein the one or more processors are further configured to:

group two or more additional grants included the second part of the DCI in a second group; and map each grant in the second group to a second PUCCH.

12. A user equipment (UE), comprising:

one or more memories; and one or more processors communicatively coupled to the one or more memories, the one or more processors, either alone or in combination, configured to:

receive, during at least one slot, transmission from a wireless network component of a Physical Downlink Control Channel (PDCCH) and a Physical Downlink Shared Channel (PDSCH), the PDCCH including a first part of a Downlink Control Information (DCI), the PDSCH including a second part of the DCI;

group two or more grants included in the second part of the DCI in a first group; and map each grant in the first group to a first Physical Uplink Control Channel (PUCCH);

wherein the grouping is based on an association between (i) a latest of the two or more grants being associated with a first non-zero DCI-to-PUCCH offset, and (ii) at least one grant non-latest of the two or more grants being associated with a first zero or non-numerical DCI-to-PUCCH offset.

13. A wireless network component, comprising:

scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI;

means for transmitting the PDCCH and the PDSCH during the at least one slot;

means for grouping two or more grants included in the second part of the DCI in a first group; and means for mapping each grant in the first group to a first Physical Uplink Control Channel (PUCCH);

wherein the grouping is based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset.

14. The wireless network component of claim 13, further comprising:

means for grouping two or more additional grants included in the second part of the DCI in a second group; and means for mapping each grant in the second group to a second PUCCH.

15. A wireless network component, comprising:

scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI;

means for transmitting the PDCCH and the PDSCH during the at least one slot;

means for grouping two or more grants included in the second part of the DCI in a first group; and means for mapping each grant in the first group to a first Physical Uplink Control Channel (PUCCH);

wherein the grouping is based on an association between (i) a latest of the two or more grants being associated with a first non-zero DCI-to-PUCCH offset, and (ii) at least one non-latest grant of the two or more grants being associated with a first zero or non-numerical DCI-to-PUCCH offset.

16. A user equipment (UE), comprising:

means for receiving, during at least one slot, transmission from a wireless network component of a Physical Downlink Control Channel (PDCCH) and a Physical Downlink Shared Channel (PDSCH), the PDCCH including a first part of a Downlink Control Information (DCI), the PDSCH including a second part of the DCI;

means for grouping two or more grants included in the second part of the DCI in a first group; and means for mapping each grant in the first group to a first Physical Uplink Control Channel (PUCCH);

wherein the grouping is based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset.

17. The UE of claim 16, further comprising:

means for grouping two or more additional grants included the second part of the DCI in a second group; and means for mapping each grant in the second group to a second PUCCH.

18. A user equipment (UE), comprising:

means for receiving, during at least one slot, transmission from a wireless network component of a Physical Downlink Control Channel (PDCCH) and a Physical Downlink Shared Channel (PDSCH), the PDCCH including a first part of a Downlink Control Information (DCI), the PDSCH including a second part of the DCI;

means for grouping two or more grants included in the second part of the DCI in a first group; and means for mapping each grant in the first group to a first Physical Uplink Control Channel (PUCCH);

wherein the grouping is based on an association between (i) a latest of the two or more grants being associated with a first non-zero DCI-to-PUCCH offset, and (ii) at least one grant non-latest of the two or more grants being associated with a first zero or non-numerical DCI-to-PUCCH offset.

19. A non-transitory computer-readable medium storing computer-executable instructions that, when executed by a wireless network component, cause the wireless network component to:

scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI;

transmit the PDCCH and the PDSCH during the at least one slot;

group two or more grants included in the second part of the DCI in a first group; and map each grant in the first group to a first Physical Uplink Control Channel (PUCCH);

wherein the grouping is based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset.

20. The non-transitory computer-readable medium of claim 19, further comprising computer-executable instructions that, when executed by the wireless network component, cause the wireless network component to:

group two or more additional grants included in the second part of the DCI in a second group; and map each grant in the second group to a second PUCCH.

21. The non-transitory computer-readable medium of claim 19, wherein the grouping is based on an association between (i) a latest of the two or more grants being associated with a first non-zero DCI-to-PUCCH offset, and (ii) at least one non-latest grant of the two or more grants being associated with a first zero or non-numerical DCI-to-PUCCH offset.

22. A non-transitory computer-readable medium storing computer-executable instructions that, when executed by a user equipment (UE), cause the UE to:

receive, during at least one slot, transmission from a wireless network component of a Physical Downlink Control Channel (PDCCH) and a Physical Downlink Shared Channel (PDSCH), the PDCCH including a first part of a Downlink Control Information (DCI), the PDSCH including a second part of the DCI;

group two or more grants included in the second part of the DCI in a first group; and map each grant in the first group to a first Physical Uplink Control Channel (PUCCH);

wherein the grouping is based on an association between (i) an earliest of the two or more grants being associated with a first non-zero DCI-to-PUCCH offset, and (ii) at least one non-earliest of the two or more grants being associated with a first zero or non-numerical DCI-to-PUCCH offset.

* * * * *